United States Patent
Cazin et al.

(10) Patent No.: US 11,386,131 B2
(45) Date of Patent: Jul. 12, 2022

(54) SYSTEM AND METHOD FOR MULTI-LANGUAGE SEARCH

(71) Applicant: Microsoft Technology Licensing, LLC, Redmond, WA (US)

(72) Inventors: Victor Cazin, Paris (FR); Laetitia Gabet, Antony (FR); Edouard Hamonière, Paris (FR); Christophe Pierret, Sèvres (FR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 332 days.

(21) Appl. No.: 15/991,104

(22) Filed: May 29, 2018

(65) Prior Publication Data

US 2019/0370392 A1  Dec. 5, 2019

(51) Int. Cl.
*G06F 16/33* (2019.01)
*G06F 16/38* (2019.01)
*G06F 40/40* (2020.01)
*G06F 16/951* (2019.01)

(52) U.S. Cl.
CPC ........ *G06F 16/3337* (2019.01); *G06F 16/334* (2019.01); *G06F 16/3334* (2019.01); *G06F 16/38* (2019.01); *G06F 40/40* (2020.01); *G06F 16/951* (2019.01)

(58) Field of Classification Search
CPC .... G06F 16/3337; G06F 16/334; G06F 16/38; G06F 16/3334; G06F 16/951; G06F 40/40
See application file for complete search history.

(56) References Cited

U.S. PATENT DOCUMENTS

| | | | | |
|---|---|---|---|---|
| 7,467,131 B1 * | 12/2008 | Gharachorloo | ..... | G06F 16/9574 |
| 8,375,025 B1 * | 2/2013 | Datar | ..... | G06F 16/951 |
| | | | | 707/727 |
| 8,782,071 B1 * | 7/2014 | Mukherjee | ..... | G06F 16/9535 |
| | | | | 707/759 |
| 9,135,307 B1 * | 9/2015 | Panda | ..... | G06F 16/24578 |

(Continued)

OTHER PUBLICATIONS

Johnston, et al., "Lucene query syntax in Azure Search", Retrieved from: https://docs.microsoft.com/en-us/rest/api/searchservice/lucene-query-syntax-in-azure-search#bkmk_fields, Sep. 15, 2017, 7 Pages.

(Continued)

*Primary Examiner* — Jensen Hu
(74) *Attorney, Agent, or Firm* — Fiala & Weaver P.L.L.C.

(57) ABSTRACT

Systems and methods for providing a multi-language search include a query receiver that receives a search query from a search user interface that includes a search term in a first language. A search results evaluator determines whether execution of the search query will produce a sufficient number of search results. A cross-language search manager, in response to determining that the processing of the search query will not produce the sufficient number of search results, obtains a first translated version of the search term, requests that a search be executed by a search engine based on at least the search term and the first translated version of the search term, receives a set of search results from the search engine based on the search; and returns the set of search results to the search user interface.

24 Claims, 13 Drawing Sheets

(56) References Cited

U.S. PATENT DOCUMENTS

| | | | | |
|---|---|---|---|---|
| 10,108,611 | B1* | 10/2018 | Pierard | G06F 40/51 |
| 2001/0021934 | A1* | 9/2001 | Yokoi | G06F 16/9535 |
| | | | | 715/264 |
| 2004/0194099 | A1* | 9/2004 | Lamping | G06F 16/9535 |
| | | | | 718/100 |
| 2007/0106653 | A1* | 5/2007 | Sun | G06F 16/951 |
| 2008/0288474 | A1* | 11/2008 | Chin | G06F 16/3337 |
| 2009/0024595 | A1* | 1/2009 | Chen | G06F 40/58 |
| 2009/0083243 | A1* | 3/2009 | Heymans | G06F 16/2452 |
| 2009/0193003 | A1* | 7/2009 | Heymans | G06F 16/3337 |
| 2010/0082604 | A1* | 4/2010 | Gutt | G06F 16/3326 |
| | | | | 707/721 |
| 2011/0231379 | A1* | 9/2011 | Kruglick | G06F 16/9535 |
| | | | | 707/706 |
| 2012/0124071 | A1* | 5/2012 | Gebhard | G06F 16/90324 |
| | | | | 707/767 |
| 2012/0278309 | A1* | 11/2012 | Tang | G06F 16/9535 |
| | | | | 707/722 |
| 2014/0358890 | A1* | 12/2014 | Chen | G06F 16/3329 |
| | | | | 707/710 |
| 2019/0129995 | A1* | 5/2019 | Kataria | G06N 3/0454 |

OTHER PUBLICATIONS

Lembicz, et al., "Create an index for documents in multiple languages in Azure Search", Retrieved from: https://docs.microsoft.com/en-us/azure/search/search-language-support, Apr. 20, 2018, 3 Pages.

Lembicz, et al., "Language analyzers in Azure Search", Retrieved from: https://docs.microsoft.com/en-us/rest/api/searchservice/language-support, Retrieved on: Sep. 28, 2017, 5 Pages.

* cited by examiner

SYSTEM AND METHOD FOR MULTI-LANGUAGE SEARCH

BACKGROUND

Search engines and services are used to search digital databases, catalogs and the like for items of interest to the user. In a typical search scenario, a user enters a search query in the form of one or more words that describe the items that the user is interested in locating. The user can often refine the search query further through the use Boolean operators. The entered search query is transmitted to the search engine for execution. The search engine executes the search query by comparing it to an index of data associated with items in a digital database maintained by the search engine to find the items in the digital database (e.g., documents, rows of information, objects, images, etc.) that are most relevant to the search query entered by the user. The search engine returns the located items in a prioritized list to the user with items that most closely matched the entered search query positioned at the top of the list. A user typically enters his or her search query in his or her native or preferred language and the search engine is configured to apply that search query to find results in the same language as the entered search query.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses for providing a multi-language search include a query receiver that receives a search query from a search user interface that includes a search term in a first language. A search results evaluator determines whether execution of the search query will produce a sufficient number of search results. A cross-language search manager, in response to determining that the processing of the search query will not produce the sufficient number of search results, obtains a first translated version of the search term, requests that a search be executed by a search engine based on at least the search term and the first translated version of the search term, receives a set of search results from the search engine based on the search; and returns the set of search results to the search user interface.

Further features and advantages of the systems and methods, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present methods and systems and, together with the description, further serve to explain the principles of the methods and systems and to enable a person skilled in the pertinent art to make and use the methods and systems.

Figure 1:
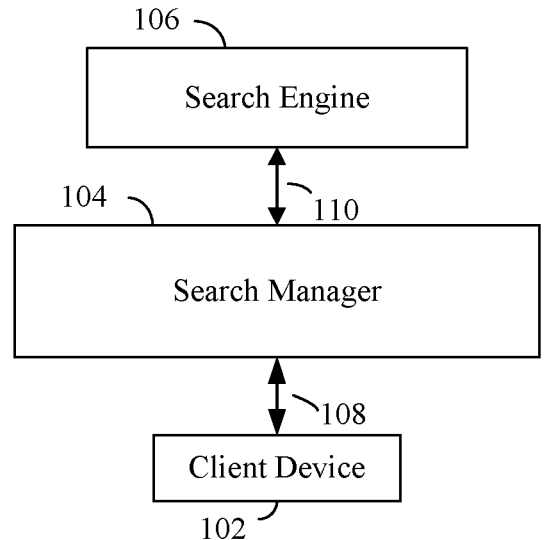
FIG. 1 is a block diagram of a computing device-based system for performing a multi-language search in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Introduction

The present specification and accompanying drawings disclose one or more embodiments that incorporate the features of the present methods and systems. The scope of the present methods and systems is not limited to the disclosed embodiments. The disclosed embodiments merely exemplify the present methods and systems, and modified versions of the disclosed embodiments are also encompassed by the present methods and systems. Embodiments of the present methods and systems are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

The example embodiments described herein are provided for illustrative purposes and are not limiting. The examples described herein may be adapted to any type of method or system for performing a multi-language search. Further structural and operational embodiments, including modifications/alterations, will become apparent to persons skilled in the relevant art(s) from the teachings herein.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Example Embodiments

Methods and systems described herein relate to performing a multi-language search. As an example, a catalog may contain a number of digital items such as 3D objects. These items may have metadata fields describing them such as "title", "description" and "tags". In some cases, these metadata fields are available in different languages for the same item. An example of such multiple language metadata fields is Title_en (the title of the object in English), Title_fr (the title of the object in French), Description_en (a description of the object in English), Description_fr (a description of the object in French). Search engines compare search queries to these metadata fields to determine matches between the search queries and the items in the catalog. Often, a searcher may only be interested in the media files representing the item itself (e.g. an image and/or 3D file) and unaware of the metadata fields associated with the item, which are only provided to help in identifying the object. Hence, a user may be interested in an item that does not have metadata fields in a language he understands.

In accordance with embodiments described herein, users searching a catalog can submit a query term in their native language and still search a metadata field in another language. The most relevant search results are returned to a user based upon his or her native or preferred language. Items with metadata in this preferred language are prioritized to the top of the list of search results. As a result, the user is able to retrieve an item matching the user's search query even if the user's search query and the item's metadata fields are not in the same language. Such second language items may be returned in lower positions than items having metadata fields in the user's preferred language if desired. Thus, in the context of a catalog search, metadata fields in the preferred languages of the user may be prioritized while the user is still able to retrieve additional items with metadata field matches in other secondary languages.

The above objectives are furthered by, when an item has its metadata fields translated in different languages, making the item searchable in these languages. If a user query does not return enough results in the user's preferred language, the query term or terms are translated it into other languages and a search performed for items with the new translated query terms. Typically, translations directly provided when ingesting the item in a catalog are more accurate than any later automatic translations are likely to be. Thus, a user will likely be more interested in items that have their metadata originally (e.g. not automatically translated) in one of the preferred languages he or she can understand. Given this, in an embodiment, results coming from a localized search with the user entered query terms are displayed first while results coming from a cross-language search that utilizes later translated search terms are appended to the localized results when there are not enough localized results (e.g. below a defined threshold of number of results).

Two possible options for obtaining translations when searching across different languages are (1) automatically translate metadata of all items to all the supported languages such that a search query in any language can potentially retrieve any item or (2) automatically translate the search query to all the supported languages. Option number 2 may be advantageous in that the storage and computing cost is very high in accordance with option 1 and most translations would likely not ever be used. Furthermore, automatic translations are not very accurate and may dramatically increase false positive matching when performing searches. Translating all of the metadata into all of the relevant languages also means that any change to a translation engine or algorithm will require re-computing all of the translated metadata.

Translating a search query may involve making a call to a translation service over a network. However, this can add latency to the search call overall. In addition, a call to a translation service typically consumes system resources. Thus, embodiments that utilize a translation cache reduce call latency and the number of calls to the translation service, thereby saving time and system resources.

A cross language search query is costlier than a localized search query because of the translation service costs and increased latency of response time (takes more time to return results to the user). Therefore, it is beneficial to assess the need for a cross-language search prior to performing one. In accordance with various embodiments, hints such as prior search results are used to better decide whether a cross-language search is appropriate for a given search. This helps reduce costs by using a simple, less expensive, localized search query when a cross-language query is not needed. Thus, using hints and a configurable strategy, the system can determine whether to execute a cross-language search query or just a localized search query to save time.

After search results are returned to the user, the hints are updated to help refine the strategy that will be used the next time someone types a similar search query. A cache hint may be constituted of a key and a value. The key is used to retrieve the value stored. After making a localized search query, the cache may be updated with Key=the query and Value=the number of results returned. After making a cross-language search, the cache may be updated with Key=the query and Value=the number of results a localized search would have returned. A cache entry may also be assigned a life duration. When this life duration expires, the entry is then removed from the cache. This is beneficial in that the database upon which the cache entries are based may be constantly changing such that prior results and no longer indicative of current results.

In accordance with various embodiments, a relevant result ranking strategy may also be implemented to give priority to the search results that have metadata fields in the user's preferred languages. This is particularly helpful for powering searches of catalog of items where the language of the metadata is not critically important to a user. Examples of such catalogs are catalogs of images, 3D objects, physical goods, games, etc. The ranking strategy may be tunable based on any available information regarding preferred languages of the user. The goal of this approach is to have a scoring profile that is adapted to the user's language preferences. To do so, the search query is crafted with user selected weights to accommodate the user's preferences. There can be only a limited number of scoring profiles stored in a search engine so creating a custom scoring profile allows the strategy to be tuned to exactly fit all user preferences. One option to define the ranking strategy is to create a dedicated scoring profile for every language supported and have the search manager pick the appropriate scoring profile. Another option is to have the search manager enhance the original user search query with weights depending on user language preferences (e.g. via the HTTP header accept-language or user account preference). A mix of the above described options can be beneficial for cases when the data regarding the user's preferences is limited to basic data such as the country from which the query originated. In such a case, a default ranking strategy using a scoring profile determined based upon the language or country form which the query originated is useful.

In addition to the above discussed benefits, various embodiments of the multi-language search systems and methods described herein provide a cost saving system with a configurable call parallelization strategy. For efficiency purposes the multi-language search may be broken down into a localized search and a cross-language search which are then performed in parallel. If the localized search returns a sufficient number of search results that are relevant to a user in his or her native or preferred language, the cross-language search is terminated to minimize the costs and time associated with the cross-language search.

With the above objects in mind, FIG. 1 is a block diagram of a computing device-based system 100 for performing a multi-language search that includes a client device 102, a search manager 104 and a search engine 106 connected by communication channels 108 and 110 in accordance with an example embodiment. In the embodiment of FIG. 1, the system is implemented as a cross-language search service front door that uses a remote search engine as the backend search engine.

Client device 102 is used to run applications that utilize search services provided by search engine 106. A user enters a search query into client device 102. In response to the entry of a search query, client device 102 sends the search query to search manager 104 and receives search results back from search manager 104. Client device 102 may be any type of stationary or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a Blackberry® device, etc.), a stationary computing device such as a desktop computer or PC (personal computer), a gaming system (Xbox®), etc.

Search manager 104 receives search queries from client 102. The search queries are transformed by search manager 104 into localized and cross-language search queries as described in more detail herein. By crafting of localized and cross-language search queries based upon the search queries received from client 102, search manager 104 improves the results of the search by increasing the number of search results for some queries.

Search engine 106 executes searches based upon the search queries received from search manager 104 through communication channel 110 and then returns the results to the search manager 104. Alternatively, the search results may be returned directly from search engine 106 to the client device 102. The search results may include a prioritized list of items having metadata that most closely matches the received search query. The search engine may comprise Microsoft® Azure® Search, or any other suitable search engine or service.

Communication channels 108 and 110 may be any type of suitable wireless and/or wired communication channels such as IP (Internet protocol), cellular, wi-fi, etc. For example, client device 102, search manager 104 and search engine 106 may each be included in a respective computing device (or respective set of computing devices) that are communicatively coupled via a network. The network may comprise any type of communication links that connect computing devices and servers such as, but not limited to, the Internet, wired or wireless networks and portions thereof, point-to-point connections, local area networks, enterprise networks, and/or the like.

Figure 2:
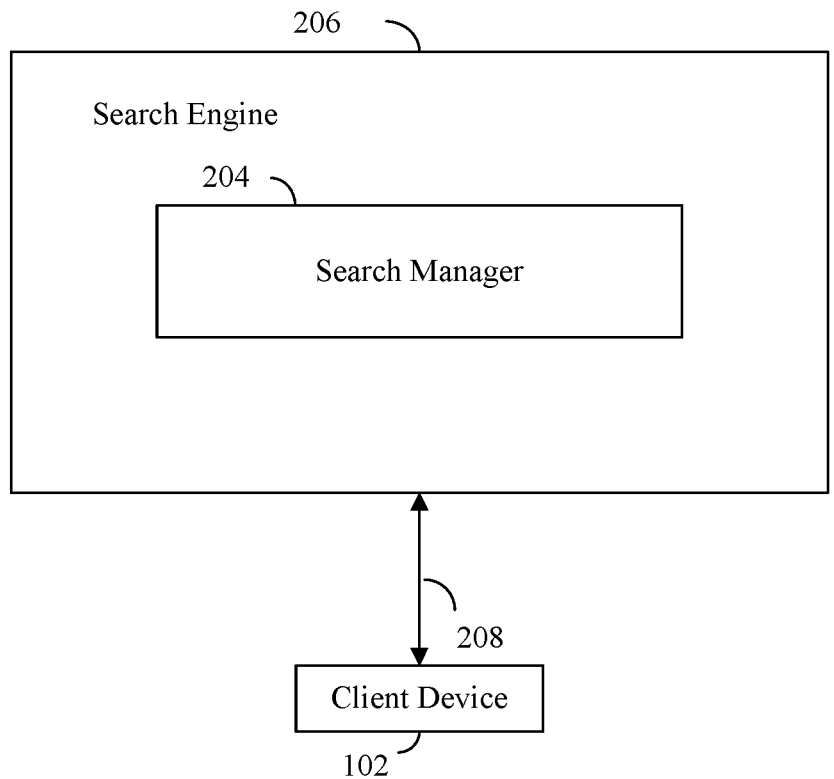
FIG. 2 is a block diagram of a search engine-based system for performing a multi-language search in accordance with another example embodiment.

In an embodiment, search manager 104 may be an integral part of search engine 106. FIG. 2 is a block diagram of a search engine-based system for performing a multi-language search that includes client device 102, search manager 104 and search engine 106 connected by communication channel 108 in accordance with an example embodiment. In the embodiment of FIG. 2, client device 102, search manager 104 and search engine 106 function as described with respect to FIG. 1. However, in contrast to the embodiment of FIG. 1, search manager 104 is an integral component of search engine 106. Thus, search manager 104 may be a standalone component or service that communicates with remote search engine 106 or be incorporated into search engine 106 itself as a component.

Figure 3:
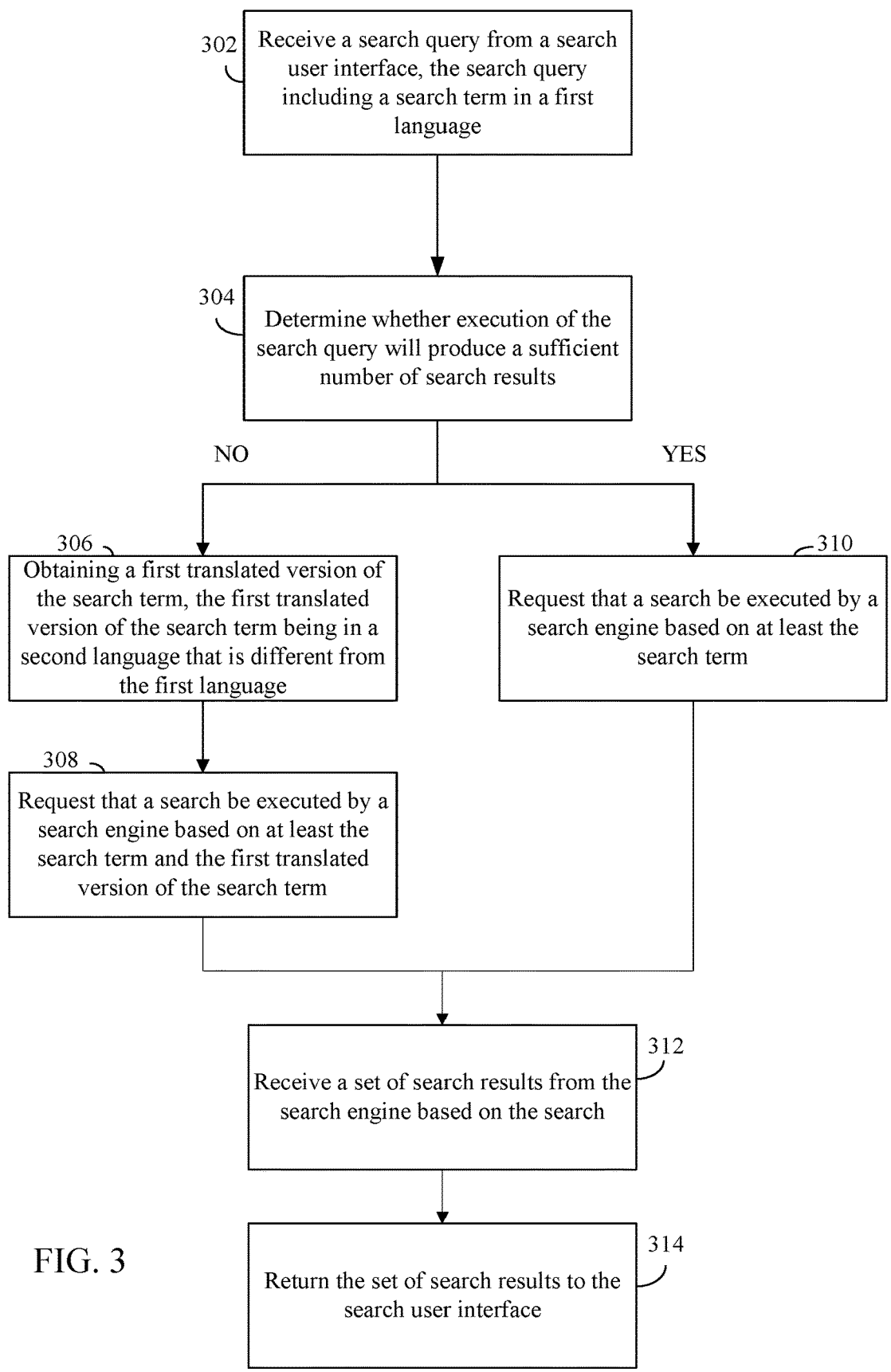
FIG. 3 is a flowchart of a method of for performing a multi-language search in accordance with an example embodiment.

FIG. 3 is a flowchart 300 of a method of providing a multi-language search in accordance with an example embodiment. By utilizing a multi-language search, users searching a catalog can submit a query term in their preferred language and still search metadata fields having data in other languages. In addition, the most relevant search results may be returned to a user based upon his or her native or preferred languages. As a result, the user is able to retrieve an item matching the user's search query even if the user's search query and the item's metadata fields are not in the same language. Flowchart 300 may be performed by search manager 104 of FIGS. 1 and 2.

Flowchart 300 begins with step 302. In step 302, a search query is received from a search user interface, the search query including a search term in a first language. The search user interface may be on a client device that communicates the search query to a search manager through a communication channel as described with respect to FIGS. 1 and 2. The search user interface may be an application on the client device that includes a data entry element into which a user types the search query terms. Upon entry of the search query, the client device calls (e.g. issues an API call) to the search manager to which the entered query is provided.

In step 304, it is determined whether execution of the search query will produce a sufficient number of search results. Step 304 may be performed by search manager 104 of FIGS. 1 and 2. The search results may be evaluated by comparing a number of search results received or, predicted to be received, to a previously determined number of desired results. If the number of search results is less than the predetermined number of desired results, this indicates that a cross-language search is needed. The number of search results that will be received from the search engine may be determined based upon an actual completed current search or a hint based on prior search results that is stored in a search results cache. If the number of search results is sufficient, a localized search may be all that is required.

If it is determined in step 304 that execution of the search query will not produce a sufficient number of search results, flowchart 300 proceeds to step 306. In step 306, a first translated version of the search term is obtained, the first translated version of the search term being in a second language that is different from the first language. As discussed in more detail herein, the translated version of the search term may be obtained from a translation cache or a remote translation service. Step 306 may be performed by search manager 104 of FIGS. 1 and 2.

Once a translated version of the search term has been obtained in step 306, flowchart 300 proceeds to step 308. In step 308, it is requested that a search be executed by a search engine based on at least the search term and the first translated version of the search term. The request may include a search query crafted by a cross-language search manager for transmission to the search engine. The search engine may comprise Microsoft® Azure® Search or any other suitable search engine or service. Step 308 may be performed by search manager 104 of FIGS. 1 and 2. After the search of step 308 has been requested, the method then proceeds to step 312.

If it was determined in step 304 that execution of the search query will produce a sufficient number of search results, flowchart 300 proceeds to step 310. In step 310, it is requested that a search be executed by a search engine based on at least the received search term. Since it was previously determined that a search based on just the search term will return a sufficient number of results, there is no need for any further searching and a cross-language search as described in steps 306 and 308 is not performed. Step 310 may be performed by search manager 104 of FIGS. 1 and 2. The method then proceeds to step 312.

In step 312, a set of search results is received from the search engine based on the search. The set of search results may include a prioritized list of items having metadata that corresponds to the utilized search terms. Step 312 may be performed by search manager 104 of FIG. 4.

Once the search results have been received, the method then proceeds to step 314. Flowchart 300 ends in step 314 wherein the set of search results are returned to the search user interface of the client device. Step 314 may be performed by search manager 104 of FIGS. 1 and 2.

As an example of a cross-language search such as described above with respect to FIG. 3, consider the search query "poulet" which means "chicken" in French. If a user searches for "Poulet" and no items are located with their metadata matching "Poulet", but there are items that have "chicken" in metadata fields in English, the "chicken" search results may be returned even if the metadata of those items does not match the language of the original search query. This is particularly beneficial when the items of interest are images such that a user is not interested in the language of their metadata.

Figure 4:
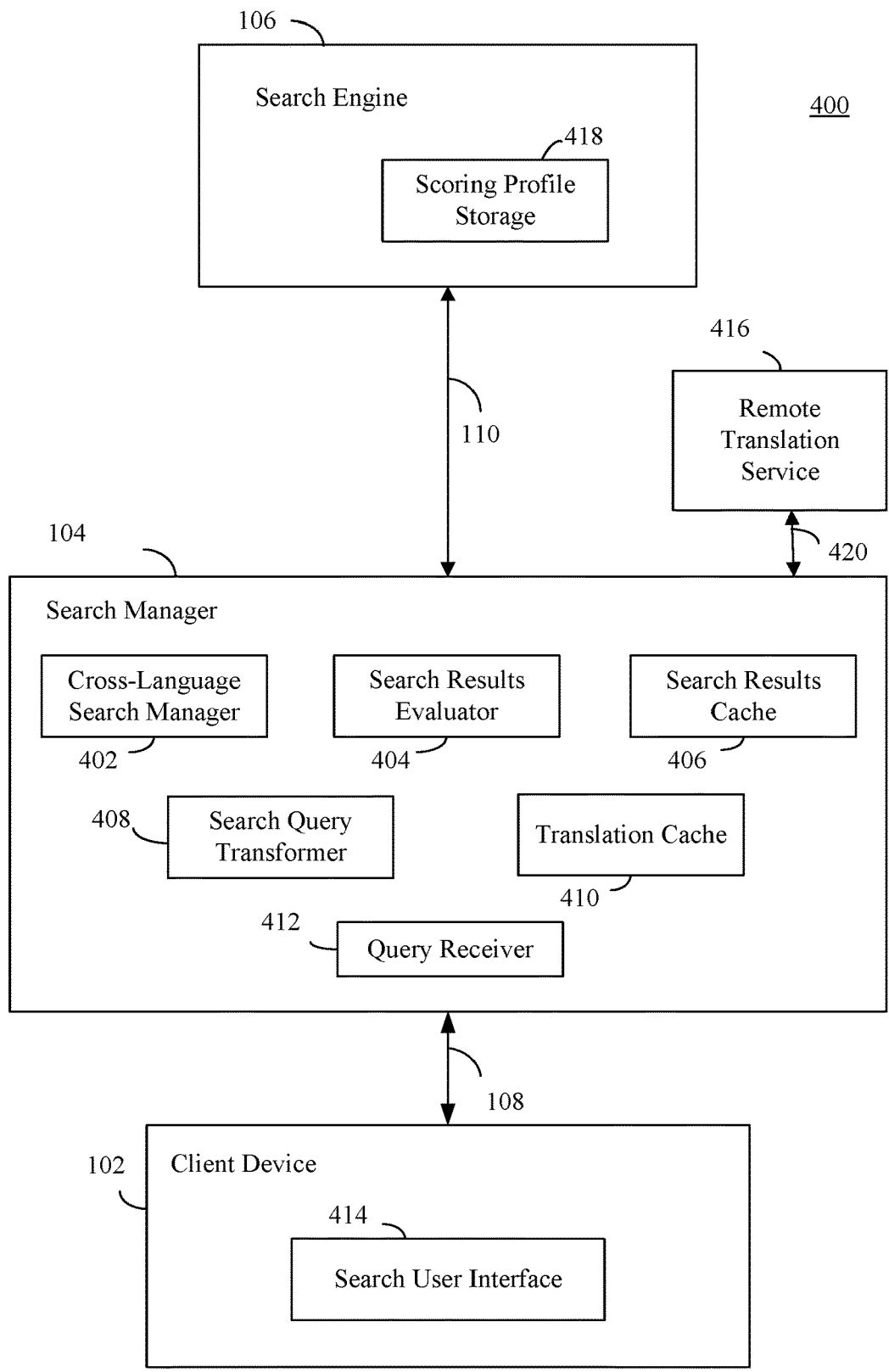
FIG. 4 is a block diagram of a computing device-based system for performing a multi-language search in accordance with an example embodiment.

FIG. 4 is a block diagram of a computing device-based system for performing a multi-language search in accordance with an example embodiment that includes client device 102, search manager 104 and search engine 106 connected by communication channels 108 and 110. Client 102 includes a search user interface 414. Search manager 104 includes a cross-language search manager 402, search results evaluator 404, search results cache 406, search query transformer 408, translation cache 410 and query receiver 412. Search manager communicates with a remote translation service 416 through communication channel 420. Search engine 106 includes a scoring profile storage 418. These features of FIG. 4 are discussed below.

A user enters a search query into search user interface 414 on client device 102 and the search query is transmitted to search manager 104 via communication channel 108. Query receiver 412 receives the search query from client device 102 through communication channel 108. The search query is in a first language that is the native or preferred language of the user submitting the search query. Step 302 of FIG. 3 may be performed by query receiver 412.

Search query transformer 408 transforms the search query received from client device 102 by query receiver 412 into a localized search query. Search query transformer 408 may transform the search query into a localized search query by identifying a preferred language associated with the search query and assigning search relevancy weights to each of various different language versions of a metadata field targeted by the search. Search query transformer 408 may achieve this by including in the localized form of the search query a search relevancy weight for each combination of the search terms and each of the different language versions of the metadata field (a "term boosting" approach). Alternatively, search query transformer 408 may transform the search query from a non-localized form to a localized form by identifying a scoring profile that assigns search relevancy weights to each of the different language versions of the metadata field.

Search results evaluator 404 is used to evaluate the expected search results received from search engine 106 in response to a particular search query being sent to search engine 106 by search manager 104. Search results evaluator 404 compares a number of search results received or, predicted to be received, in response to a search query to a previously determined number of desired results and then indicates if a cross-language search is required. Search results evaluator 404 may determine the number of search results based upon an actual completed search or a hint based on expected search results that is stored in search results cache 406. If the number of search results is sufficient, a localized search may be all that is required.

Search results cache 406 stores information concerning search results received from prior searches requested by search manager 104 that can be quickly and efficiently retrieved by search results evaluator 404. Search results cache 406 may be a separately defined cache or part of the general storage available to search manager 104. Performing a search consumes time and computing power. By storing prior search results, search results cache 406 eliminates the need to perform a search to determine the expected number of results.

Cross-language search manager 402 provides a system to craft complex multi-language search queries. Cross-language search manager 402 obtains the localized form of a search query and a translated version of the search query and uses the received information to craft a cross-language search query that utilizes the different language versions of the search terms. Once a cross-language search query has been crafted, cross-language search manager 402 requests that a search be executed by search engine 106 based upon the crafted cross-language search query and, in response, receives the cross-language search results from search engine 106. The cross-language search results are then returned to the search user interface 414 in client 102.

Remote translation service 416 may be any kind of translation service that receives terms from search manager 104 and returns translated versions of the terms to search manager 104. While remote translation service 416 may be used to obtain all of the needed translations for search manager 104, translating a search query by making a call to a remote translation service (e.g. translation API) can add latency and expense to the search call overall. This expense in time and money can be minimized by creating a local store of translations that can be quickly accessed as needed and described herein.

Translation cache 410 stores translations for search query terms that can be retrieved by cross-language search manager 402. If a desired translation is not available in translation cache 410, the translation can be requested from remote translation service 416. However, utilizing translation cache 410 beneficially reduces call latency and the number of calls required to remote translation service 416 as discussed herein. Translation cache 410 may be initially empty or populated with a predetermined set of preferred translations. Whenever a translation is received from remote translation service 416, translation cache 410 is updated with the newly available translation. Step 306 may be performed by translation cache 406 or remote translation service 416 of FIG. 4.

Search engine 106 contains a scoring profile storage 418 that is used to store scoring profiles. Search manager 104 sends an identifier of a scoring profile to be used in connection with a search that search engine 106 has been requested to execute. The scoring profile may be selected from among a plurality of scoring profiles stored in scoring profile storage 418 based on the preferred language associated with the search query. The selected scoring profile identifies the search relevancy weights to be applied to each of the different language versions of the metadata field. Search manager 104 may specify a scoring profile that is to be used to process a search by providing an indication of such to search engine 106. Alternatively, search manager 104 may provide a custom scoring profile to search engine 106 that is to be used to process a search.

As an example of the crafting of a cross-language search, consider the case of a French-speaking user searching for "voiture" having the English translation "car". In an embodiment, the raw search query may look like this:

```
POST /indexes/items/docs/search?api-version=2015-02-28
{"search": "voiture"}
```

After turning the search query into a localized search, it may look like this:

```
POST /indexes/items/docs/search?api-version=2015-02-28
{"search": "title_fr:voiture^100 OR title_en:voiture^50",
"queryType": "full"}
```

The "^100" and "^50" represent relevancy weights assigned to the metadata field in accordance with a term boosting based localization technique. Now using the information that "voiture" in French means "car" in English, we can enhance the localized search query to turn it into a cross-language search query:

```
POST /indexes/items/docs/search?api-version=2015-02-28
{"search": "title_fr:voiture^100 OR title_en:(voiture^50 OR car^10)", "queryType": "full"}
```

The end result of the cross-language search will be that results having "voiture" in their French metadata are returned first and, if there are not enough of these results, results having "voiture" in their English metadata are added to the results (if by any chance this word means something in English). If there are still not a sufficient number of results, results having "car" in their English metadata are added to the previously described results.

The cross-language search described herein is beneficial in a number of search scenarios. For example, it can be shown that this process is beneficial in the following cases: a French-speaking user searches something in French (example: "voiture"); a French-speaking user searching something in English (example: "chicken"); a French-speaking user searching for something that has the same meaning in both English and French (example: "dragon"); and a French-speaking user searching something that could either be French or English and has a different meaning in the two languages (example: "car". English word "car" is translated to "voiture", but "car" also means "bus" in French).

Figure 5:
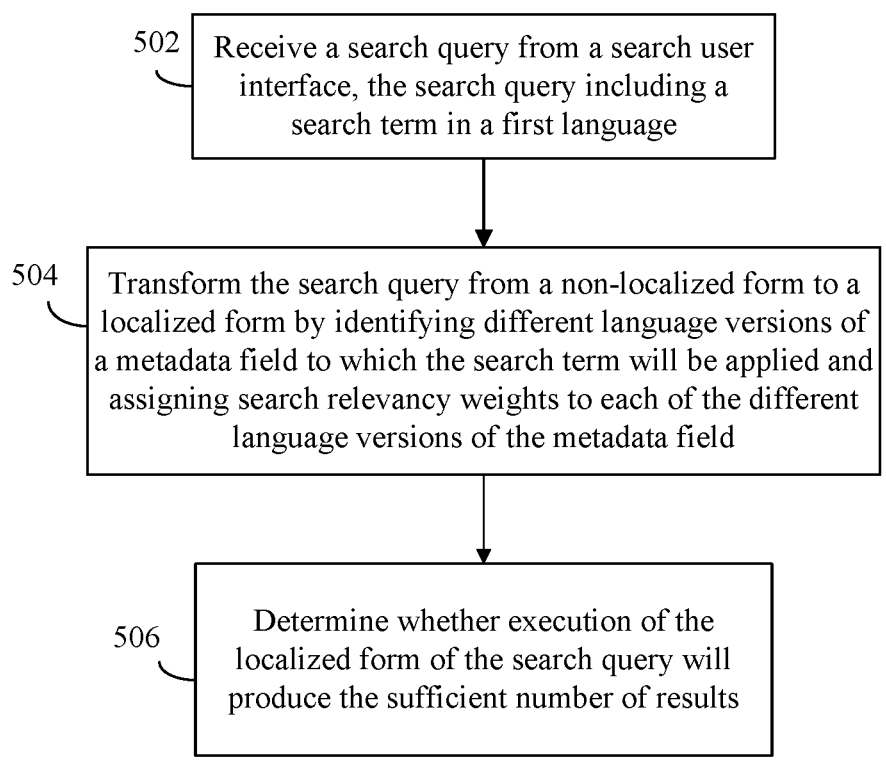
FIG. 5 is a flowchart of a method of transforming a search query from a non-localized form to a localized form by assigning search relevancy weights to each of the different language versions of the metadata field in accordance with an example embodiment.

As discussed above, the originally entered search query is transformed into a localized form. FIG. 5 is a flowchart of a method of transforming a search query from a non-localized form to a localized form by assigning search relevancy weights to each of the different language versions of the metadata field in accordance with an example embodiment.

Flowchart 500 begins with step 502. In step 502, a search query is received from a search user interface. The search query includes a search term in a first language. Step 502 of FIG. 5 may be performed by query receiver 412 of FIG. 4.

In step 504, the search query is transformed from a non-localized form to a localized form by identifying different language versions of a metadata field to which the search term will be applied and assigning search relevancy weights to each of the different language versions of the metadata field. Step 504 of FIG. 5 may be performed by search query transformer 408 of FIG. 4.

Flowchart 500 ends in step 506 wherein it is determined whether execution of the localized form of the search query will produce the sufficient number of results. As discussed herein, a cross language search query is costlier than a localized search query because of translation costs and increased latency of response time. Therefore, it is beneficial to assess the need for a cross-language search as set forth in FIG. 5 prior to performing one. Step 506 of FIG. 5 may be performed by search results evaluator 404 of FIG. 4.

Figure 6:
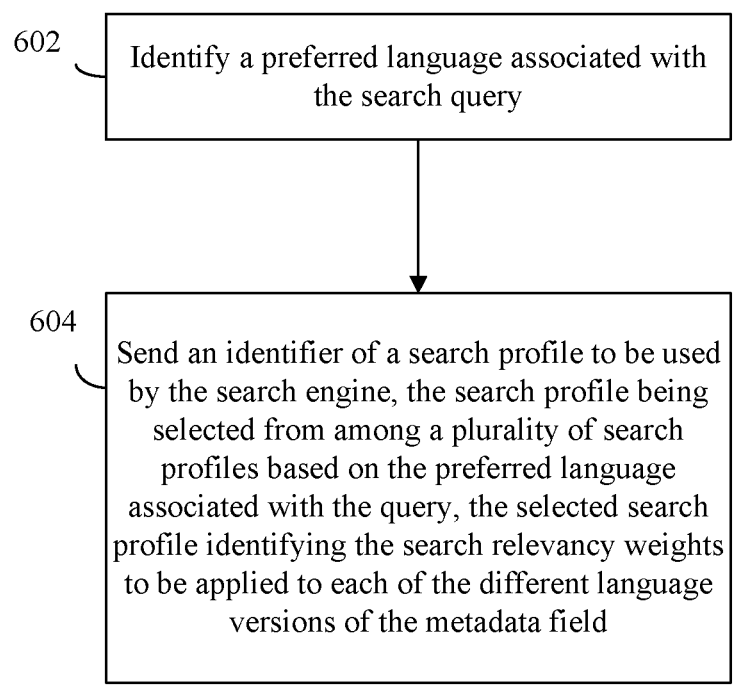
FIG. 6 is a flowchart of a method of using a search profile to identify the search relevancy weights to be applied to each of the different language versions of a metadata field in accordance with another example embodiment.

FIG. 6 is a flowchart 600 of a method of using a search profile to identify the search relevancy weights to be applied to each of the different language versions of a metadata field in accordance with another example embodiment.

Flowchart 600 begins with step 602. In step 602, a preferred language associated with the search query is identified. The preferred language can be determined in a number of different manners. In an embodiment, the preferred language associated with the search query may be determined based on information included in an accept-language header received with the search query. In another embodiment, the preferred language associated with the search query is determined based on a parameter of an account associated with a user of the search user interface. In yet another embodiment, the user may be prompted to enter their preferred language or languages. In yet another embodiment, the preferred language associated with the search query may be determined via automatic language detection.

Once a preferred language associated with the search query is identified in step 602, flowchart 600 proceeds to step 604. In step 604, an identifier of a search profile to be used by the search engine is sent to the search engine, the search profile being selected from among a plurality of search profiles based on the preferred language associated with the query, the selected search profile identifying the search relevancy weights to be applied to each of the different language versions of the metadata field. Steps 602 and 604 of flowchart 600 of FIG. 6 may be performed by search manager 104 of FIG. 4.

For example, once the user's language preferences have been determined a corresponding scoring profile can be identified. The scoring profile may be chosen by setting a scoring profile parameter in the search query provided to the search engine.

The index schema might for example contain one scoring profile per language:
  scoringProfile_en
  scoringProfile_fr
  scoringprofile_de In furtherance of the above example, the scoring profile "scoringProfile_fr" may look like this:

---

"scoringProfiles": [ {"name": "scoringProfile_fr", "text": {"weights": {"title_fr": 100, "description_fr": 50, "title_en": 20, "description_en": 10}}}]

---

This example shows a reasonable strategy where search results matching in priority via the title_fr field are favored, then via the description_fr field, then via the title_en field, then via the description_en field. In practice this means that items with metadata in French will be mostly at the top results positions while items with English metadata will be at lower positions. This can be altered by additional scoring profile strategies such as making use of item popularity. For example, an item with English metadata might be shown in a higher position than an item with French metadata, even though French is weighted more heavily than English, if the English metadata item is very popular with respect to the French item.

Identifying the preferred language of a user and specifying a scoring profile based on the preferred language associated with the search query allows the most relevant search results to be returned to the user based upon his or her native or preferred languages such that items with metadata in their preferred language are prioritized to the top of the list of search results. If needed, items identified based on second languages may be returned in lower positions than items having metadata fields in the user's preferred language. As a result, the user can retrieve an item matching the user's search query even if the user's search query and the item's metadata fields are not in the same language.

Figure 7:
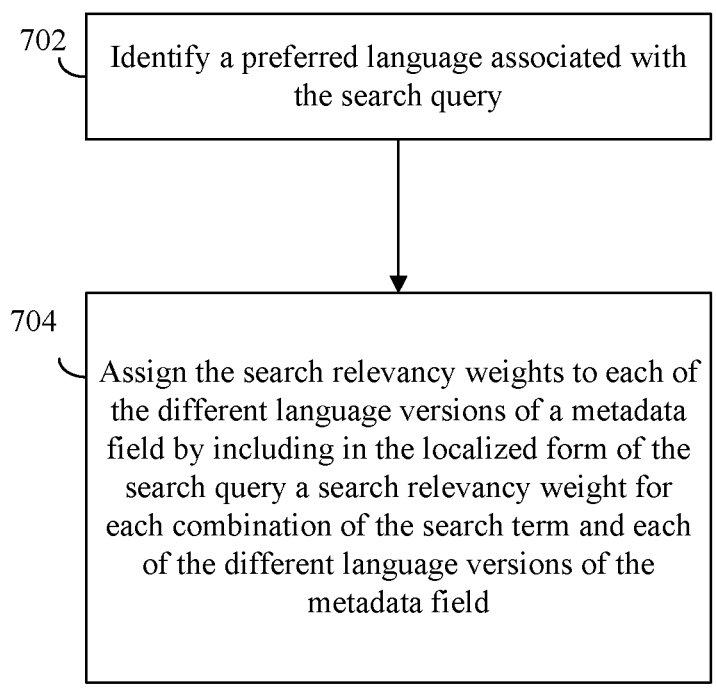
FIG. 7 is a flowchart of a method of assigning the search relevancy weights to each of the different language versions of a metadata field in accordance with an example embodiment.

FIG. 7 is a flowchart 700 of a method of assigning the search relevancy weights to each of the different language versions of a metadata field in accordance with an example embodiment. Flowchart 700 begins with step 702. In step 702, a preferred language associated with the search query is identified. As discussed with respect to FIG. 6, the preferred language of the user can be determined in a number of different manners such as by examining an accept-language heard or user account associated with the search query. Steps 702 of flowchart 700 of FIG. 7 may be performed by search manager 104 of FIG. 4. Once the preferred language associated with the search has been determined in step 702, flowchart 700 proceeds to step 704.

In step 704, search relevancy weights are assigned to each of the different language versions of a metadata field by including in the localized form of the search query a search relevancy weight for each combination of the search term and each of the different language versions of the metadata field. This approach may be referred to as "term boosting." Step 704 of FIG. 7 may be performed by search query transformer 408 of FIG. 4 which transforms the search query into a localized form.

For example, in accordance with this approach, weights may be given to some search terms to boost their ranking in the search results. This means we can make a different search query in different field. In such a case, the same words may be compared to every language metadata field but with different weights.

Using a term boosting approach, a weighted query can be crafted that can achieve the same results as the scoringProfile_fr described above. An example of such a query is set forth below:

---

POST /indexes/items/docs/search?api-version=2015-02-28
{"search": "title_fr:dragon^100 OR description_fr:dragon^50 OR title_en:dragon^20 or description_en:dragon^10", "queryType": "full"}

---

Assigning relevancy weights as described in FIG. 7 is beneficial in that it allows search results to be prioritized based on the language of the metadata filed in which the search term was located. As an example, consider the search query "dragon". The word "dragon" has the same meaning in English as in French. If an English user searches for "dragon", they may want to be provided results that have their metadata in English first. However, if such a search produces an insufficient number of results, the English user may want to see additional search results with French metadata. Conversely, if a French user searches for "dragon", they may be provided search results that have their metadata in French first, then, only if there are insufficient search results for items with "dragon" in French metadata fields, a search is performed for items with "dragon" in English metadata fields.

Figure 8:
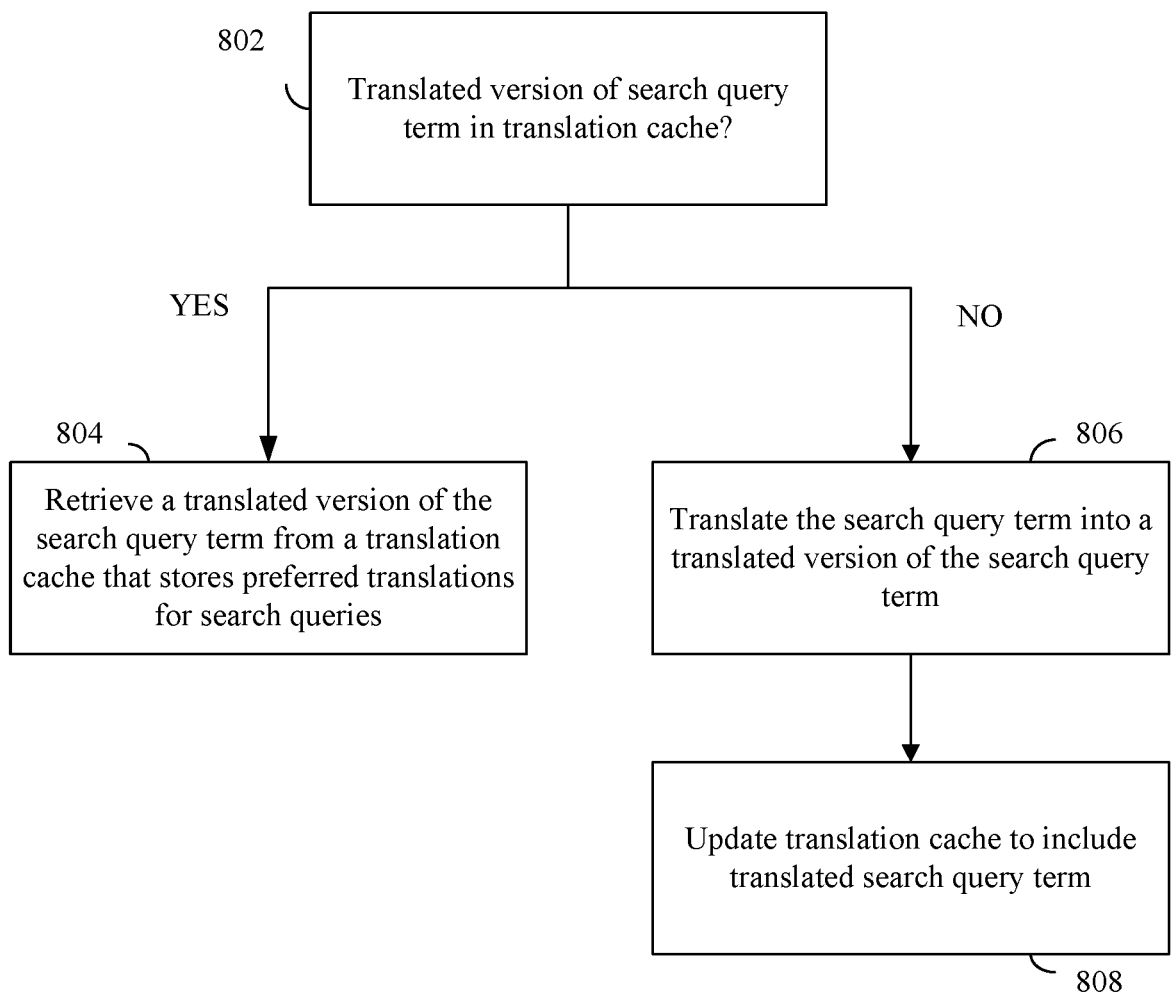
FIG. 8 is a flowchart of a method of obtaining a translated version of a search query term in accordance with an example embodiment.

An embodiment may provide for efficient indexing of multiple translations stored in a cache for future searching. FIG. 8 is a flowchart 800 of a method of obtaining a translated version of a search query term in accordance with an example embodiment. Flowchart 800 begins with step 802. In step 802, it is determined if a translated version of a search query term is in the translation cache. As discussed herein the translation cache may be initially empty or prepopulated with common or preferred translations. Step 802 can be performed by cross-language search manager 402 and translation cache 410 of FIG. 4.

If it is determined in step 802 that a translated version of a search query term is in the translation cache, flowchart 800 proceeds to step 804. In step 804, a translated version of the search query term is retrieved from a translation cache that stores preferred translations for search queries. The retrieved translation can then be used to craft a cross-language search query as described herein. Step 804 of flowchart 800 can be performed by cross-language search manager 402 and translation cache 410 of FIG. 4.

If it is determined in step 802 that a translated version of a search query term is not in the translation cache, flowchart 800 proceeds to step 806. In step 806, the search query term is translated into a translated version of the search query term. The search query term may be translated by issuing a call to a remote translation service. Translating the search query provides the ability to retrieve a document even if the search query is not in the language of the metadata. Step 806 of flowchart 800 can be performed by cross-language search manager 402 and remote translation service 416 of FIG. 4. The method then proceeds to step 808.

In step 808, the translation cache is updated to include the translated search query term. Due to the increased translation costs and latency of response time that results from an API call to a remote translation service, maintaining a translation cache improves the efficiency and response time required for a cross-language search. Step 808 of flowchart 800 can be performed by cross-language search manager 402 and translation cache 410 of FIG. 4.

Figure 9:
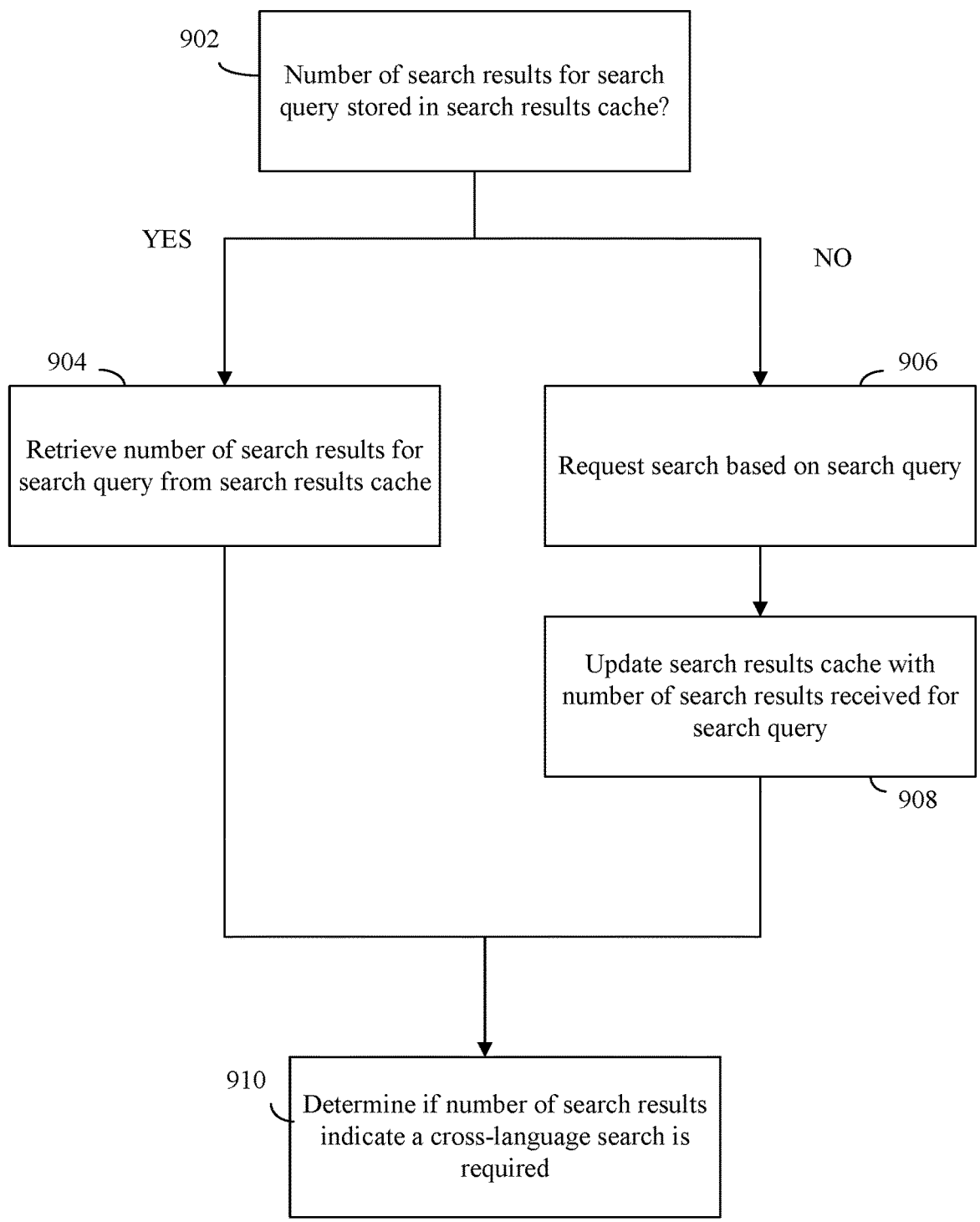
FIG. 9 is a flowchart of a method of determining if a cross-language search is required in accordance with an example embodiment.

FIG. 9 is a flowchart 900 of a method of determining if a cross-language search is required in accordance with an example embodiment. Flowchart 900 begins with step 902. In step 902, it is determined if a number of search results for a search query are stored in a search results cache. Step 902 of flowchart 900 can be performed by search results evaluator 404 and search results cache 406 of FIG. 4.

If it is determined in step 902 that a number of search results for a search query are stored in the search results cache, flowchart 900 proceeds to step 904. In step 904, the number of search results for the search query is received from the search results cache. Once the number has been received, flowchart 900 proceeds to step 910.

If it is determined in step 902 that a number of search results for a search query is not stored in the search results cache, flowchart 900 proceeds to step 906. In step 906, a search is requested based on the search query. The method then proceeds to step 908.

In step 908, a search results cache is updated with the number of search results received in response to the requested search for the search query. A cross-language search query is costlier than a localized search query because of translation service costs and increased latency of response time (takes more time to return results to the user). Therefore, it is beneficial to assess the need for a cross-language search prior to performing one. Hints such as prior search results are stored in a cache and used to better and more quickly decide whether a cross-language search is appropriate for a given search. This helps reduce costs by using a simple, less expensive, localized search query when a cross-language query is not needed. Thus, using hints and a configurable strategy, the system determines whether to go through a cross-language search query or just a localized search query.

After search results are returned, the hints in the search results cache are updated to help refine the strategy that will be used next time someone types a similar search query. As discussed above, a cache hint may comprise a key and a value. In such an embodiment, the key is used to retrieve the value stored. After making a localized search query, the search results cache is updated with Key=the query and Value=the number of results returned. The first time a given search query is processed, there is no hint in the cache about it. Depending on the configurable strategy, a decision can be made either to craft a localized search query and return the results to the user or, to craft a localized search query, then, if it is determined that it won't produce enough results, execute a cross-language search query.

In step 910, it is determined if the number of search results indicate that a cross-language search is needed. As previously discussed, executing a cross-language search query is costlier than executing a localized search query in terms of increased latency of response time. Therefore, assessing the need for a cross-language search prior to performing one minimizes the amount of unnecessary latency. Saving hints such as prior search results in a quickly accessible search results cache serves to further reduce the latency of the response.

Figure 10:
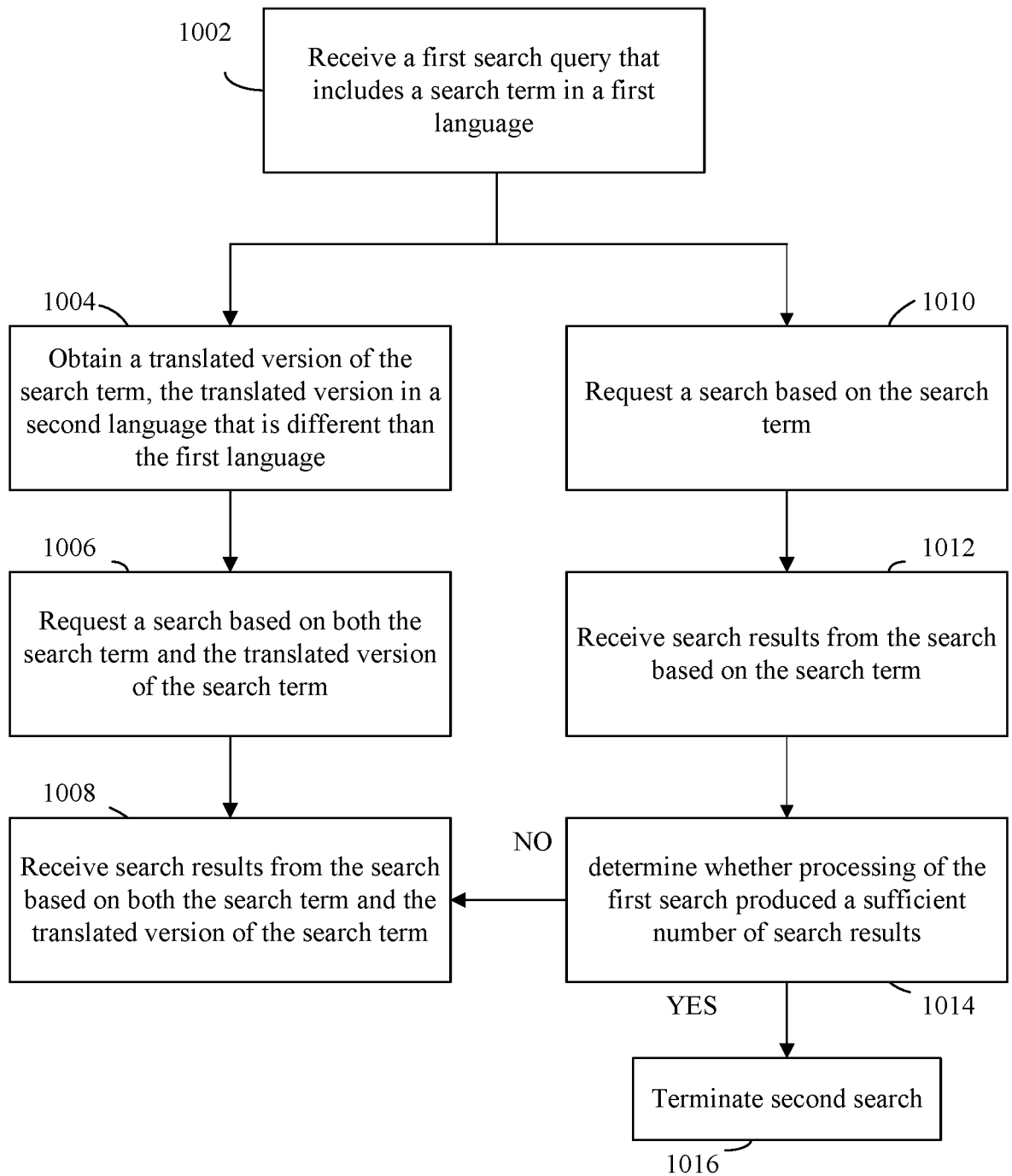
FIG. 10 is a flowchart of a method of performing a multi-language search in accordance with an example embodiment.

FIG. 10 is a flowchart of a method of performing a multi-language search in accordance with an example embodiment. While the embodiment of FIG. 10 is described with respect to two languages, a similar approach can be generalized to a greater number of languages (hence a greater number of translations) depending upon the predefined weighting strategy selected.

Flowchart 1000 begins with step 1002. In step 1002, a first search query that includes a search term in a first language is received. As discussed herein the received search query is determined or assumed to be in the preferred language of the user that entered the query. Step 1002 of FIG. 10 may be performed by query receiver 412 of FIG. 4. After step 1002, flowchart 1000 proceeds simultaneously to steps 1004 and 1010.

In step 1004, a translated version of the search term is obtained, the translated version in a second language that is different than the first language. The translated version of the search term may be obtained from a translation cache or translation service as described herein. Step 1004 of flowchart 1000 can be performed by cross-language search manager 402, translation cache 410 and remote translation service 416 of FIG. 4. The method then proceeds to step 1006.

In step 1006, a search is requested based on both the search term and the translated version of the search term. The combined search query may be crafted by a cross-language search manager based upon the original and translated versions of the search terms. Step 1006 of flowchart 1000 can be performed by cross-language search manager 402 of FIG. 4 as described above. Once the search has been requested, the method then proceeds to step 1008.

In step 1008, search results are received from the search based on both the search term and the translated version of the search term. These received cross-language search results may be prioritized based upon the language of metadata fields that matched the search terms. The search results may then be returned to the user's search interface. Step 1008 of FIG. 10 may be performed by search manager 104 of FIG. 4.

Step 1010 is performed simultaneously with step 1004. In step 1010, a search is requested based on the search term. As discussed herein, the search term may be transformed to a localized form such that search relevancy weights are assigned to each of the different language versions of a metadata field by including in the localized form of the search query a search relevancy weight for each combination of the search term and each of the different language versions of the metadata field. Step 1010 of FIG. 10 may be performed by search manager 104 and search query transformer 408 of FIG. 4.

After step 1010, the method then proceeds to step 1012. In step 1012, search results are received from the search based on the search term in response to the request of step 1010. The method then proceeds to step 1014.

In step 1014, it is determined whether processing of the first search produced a sufficient number of search results. As discussed herein, the number of search results is evaluated by comparing the number of results received to a predetermined number of desired search results. Step 1014 of FIG. 10 may be performed by search results evaluator 404 of FIG. 4.

If it is determined in step 1014 that processing of the first search did not produce a sufficient number of search results, flowchart 1000 proceeds to step 1008. In step 1008, search results are received from the search based on both the search term and the translated version of the search term. Since the combined search was based on both the original and translated terms, the first search results are duplicative of the combined search results and discarded. Step 1014 of FIG. 10 may be performed by search manager 104 of FIG. 4.

If it is determined in step 1014 that processing of the first search produced a sufficient number of search results, flowchart 1000 proceeds to step 1016. In step 1016, the second search is terminated. As discussed herein, terminating the second search reduces unnecessary processing and time expenditure associated with a cross-language search.

Figure 11:
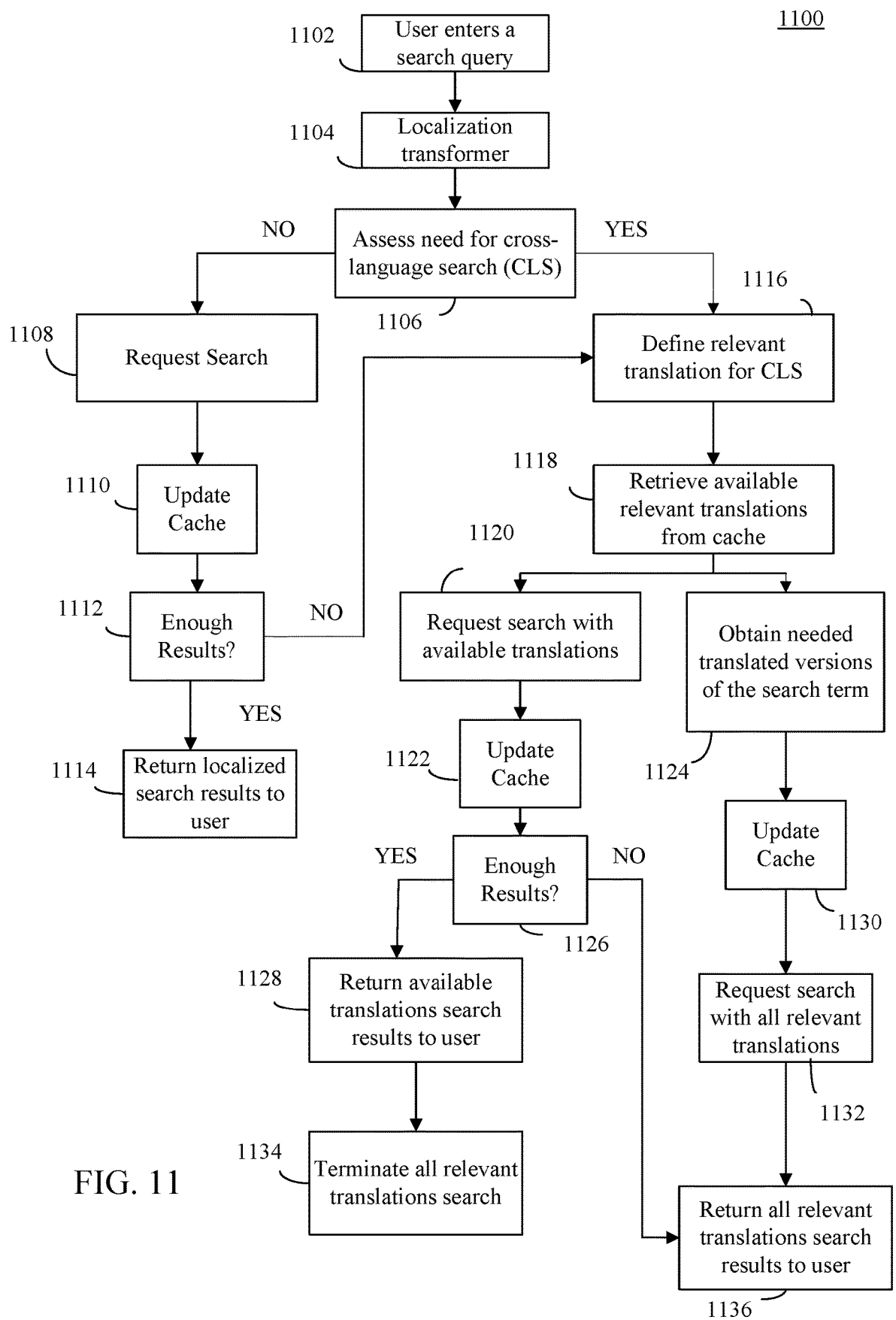
FIG. 11 is a flowchart of a method of performing a multi-language search in accordance with an example embodiment.

FIG. 11 is a flowchart 1100 of a method of performing a multi-language search in accordance with an example embodiment. Flowchart 1100 is exemplary only and alternative approaches could be used to perform such a search as described herein. Flowchart 1100 begins with step 1102. In step 1102, a user enters a search query. The search query may be entered through a user search interface on a client device as described herein.

Once the search query has been entered, the method proceeds to step 1104. In step 1104, the search query goes through a localization transformer that turns the search query into a localized search query as described above. The method then proceeds to step 1106.

In step 1106, the need for a cross-language search (CLS) is assessed. The system tries to determine whether a cross-language search will be needed according to strategic rules as discussed in more detail herein. This involves retrieving hints stored during previous similar searches and following a predefined configurable strategy. The first time a given search query is processed, there are no hints in a cache about it. Depending on the configurable strategy, a decision can be made to process a localized search query and immediately return the results to the user or, decide to process a localized search query then, if it doesn't return enough results, process another query in cross-language mode and return the results to the user. The next time a given search query is processed, a hint regarding the results of the search will already have been saved in the cache. The hint may specify how many results can be expected from the localized search. If less search results are needed than this number, a simple localized query can be used for the search. If more results than this number are needed, then a cross-language search query must be crafted and processed.

The number of search results can change compared to the hint stored in the cache because the catalog can change between the submission of two queries (e.g. new products can have been removed from or added to the catalog). This is handled by the fact that hints are refreshed after every query to better reflect the state of the catalog. Also, cache entries may be provided with an expiration date after which the value stored in the cache is removed, so if a hint is old (and less likely to reflect the current state of the catalog being searched) it will be removed after expiration of a predetermined interval of time.

If it is determined in step 1106 that a cross-language search is not required, flowchart 1100 proceeds to step 1108. In step 1108, a search is requested based upon the search query output by the localization transformer in step 1104. Thus, if it is decided in step 106 that a cross-language search is not needed, then a localized search query is sent to the search engine. In response to the request for a search, search results are returned from the search engine. Once the search results have been received, the method then proceeds to step 1110.

In step 1110, the cache is updated with the search results received from the search requested in step 1108. Cache hints are updated accordingly to improve the search strategy when future similar searches are made. The method then proceeds to step 1112.

In step 1112, it is determined whether processing of the search with the localized search query produced a sufficient number of search results. If it is determined in step 1112 that the search with the localized search query produced a sufficient number of search results, flowchart 1100 proceeds to step 1114. In step 1114, the localized search results are returned to the user and flowchart 1100 ends.

However, if it is determined in step 1112 that the search with the localized search query did not produce a sufficient number of search results, flowchart 1100 proceeds to step 1116 wherein the relevant translations for a cross-language search are defined. Similarly, if it is initially determined in step 1106 that a cross-language search is required, flowchart 1100 proceeds to step 1116. In step 1116, relevant translations for the cross-language search are defined so that the necessary translations can be obtained and a cross-language search query crafted. This is done following a configuration strategy. When a user enters a search query the user typically does not specify what language it is in. However, the user's language preferences can be determined either by retrieving them via user account settings, inferring them from user location and/or inferring them from the accept-language HTTP header that typically is associated with a user search query There are several possible approaches to determining which languages to search during the cross-language search. One possible approach is to pick the languages among user languages with a higher relevancy score and only make a translation from this language to English. Another possible approach is to make translations from all non-English languages to English. As an example: if user has "FR" and "DE" as preferred languages, their query may be translated from FR to EN and DE to EN. An example of a near-exhaustive approach would be to translate all possible combinations of the non-English languages in addition to English (e.g. user has "FR" and "DE" indicated translate from FR to DE, from DE to FR, from FR to EN, from DE to EN).

Keeping with this example, the transformed query for the first approach would be:

Field_fr:[original query]^A OR Field_de:[original query]^B OR Field_en:([original query]^C OR [translated from FR to EN]^D OR [translated from DE to EN]^E)

With A, B, C, D and E integers such that: A and B are dependent upon language preference score, each of A and B is far greater than C, and C is far greater than D and E.

Once the relevant translations for the cross-language search are defined in step 1116, the method then proceeds to step 1118. In step 1118, available relevant translations from retrieved from a cache. The cache is examined to determine if the user's query terms have already been translated into the relevant languages. The system attempts to use translations that are already available and send a first call to search engine based on the available translations. In some cases, some or all of the relevant translations will be available in the cache. In other cases, no relevant translations may be retrieved from the cache because no translations are available. The method simultaneously proceeds from step 1118 to steps 1120 and 1124.

In step 1124, any needed translated versions of the search terms are obtained. The needed translations may be obtained by calling a network-accessible remote translation service as described herein. Once the translations have been obtained, the method then proceeds to step 1130.

In step 1130, the cache is updated with the translations obtained in step 1124.

Updating the cache reduces the latency of response time for future searches. After updating the cache with the new translations, the method then proceeds to step 1132.

In step 1132, a search with all the relevant translations included is requested. The search may be requested by crafting and sending a cross-language search query to a search engine (e.g. Microsoft® Azure® Search, or any suitable search engine). The method then proceeds to step 1136.

In step 1136, the all relevant translations search results are returned to the user. The search results may be displayed in a prioritized manner on the user's search interface as described herein. By returning the all relevant translations search results, the method has avoided the situation wherein a localized search only would have returned an insufficient number of search results.

In step 1120, at the same time step 1124 is being performed and any needed translations are being obtained, a simultaneous search is requested with all of the available translations stored in the cache. The all available translation search is requested by crafting a search query based on the available translation and sending the crafted query to a remote search engine. The method then proceeds to step 1122.

In step 1122, the cache is updated with the search results received from the search requested in step 1120. When crafting the cross-language search query for the search engine, a highlight parameter may be added to the list of searchable fields such that it can be determined what words are responsible for the matches and in what fields. If any of these words is identical to a word in the original search query, it can be inferred that this item would have been retrieved with a simple localized search. Counting this number of items, it can be determined how many results a localized search would have returned without actually performing a separate search. This number can then be stored in the cache for future reference. The method then proceeds to step 1126.

In step 1126, it is determined whether processing of the search with the available relevant translations produced a sufficient number of search results. If it is determined in step 1126 that the search with the available relevant translations produced a sufficient number of search results, flowchart 1100 proceeds to step 1128. In step 1128, the available translations search results are returned to the user. The method then proceeds to step 1134.

In step 1134, the all relevant translations search is terminated. This process can be aborted if the all available translations call finishes early and has enough search results. A decision may be made to use either the all available translations search results or the all relevant translations search results depending on which search ends first and whether the all available translations call returned enough search results.

If it is determined in step 1126 that the search with the available relevant translations did not produce a sufficient number of search results, flowchart 1100 proceeds to step 1136. In step 1136, the all relevant translations search results are returned to the user as described herein.

Figure 12:
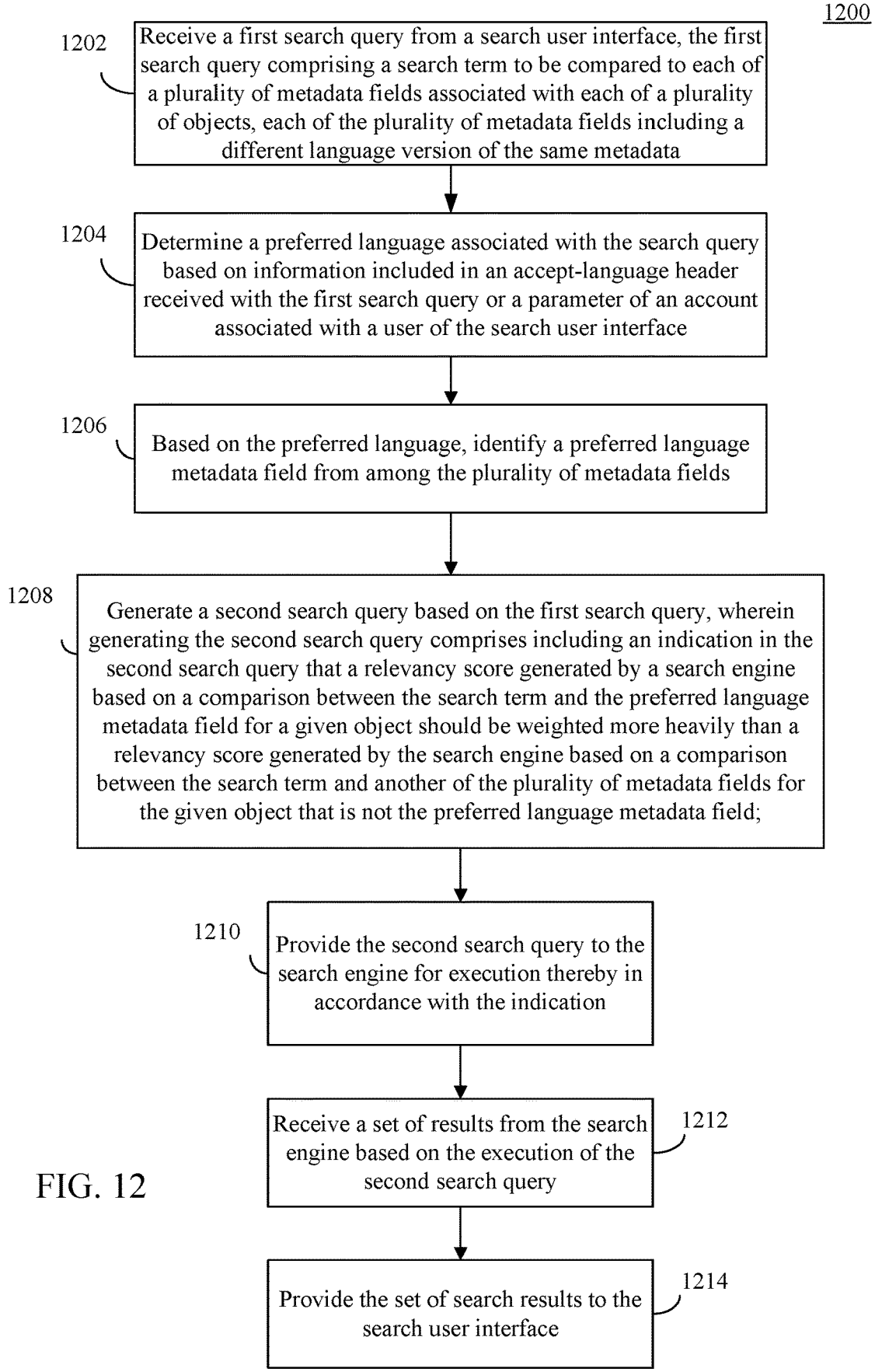
FIG. 12 is a flowchart of a method of weighting metadata fields in accordance with an example embodiment.

FIG. 12 is a flowchart of a method of weighting metadata fields in accordance with an example embodiment (term boosting localization, as referenced above). Flowchart 1200 begins with step 1202. In step 1202, a first search query is received from a search user interface, the first search query comprising a search term to be compared to each of a plurality of metadata fields associated with each of a plurality of objects, each of the plurality of metadata fields including a different language version of the same metadata. In the example of FIG. 12, the search term in its original language is compared to all the metadata fields regardless of their language. Such an embodiment is particularly beneficial when a user searches something that could reasonably be found in different language metadata fields (e.g. "Dragon", which means the same thing in French or English). In such a case, search results will be returned first that have "dragon" in metadata fields in French, then items with "dragon" in metadata fields in English.

The method then proceeds to step 1204. In step 1204, a preferred language associated with the search query is determined based on information included in an accept-language header received with the first search query or a parameter of an account associated with a user of the search user interface. The method then proceeds to step 1206.

In step 1206, based on the preferred language, a preferred language metadata field is identified from among the plurality of metadata fields. For example, if the user's preferred language is English, metadata fields in English are identified in step 1206. The method then proceeds to step 1208.

In step 1208, a second search query is generated based on the first search query, wherein generating the second search query comprises including an indication in the second search query that a relevancy score generated by a search engine based on a comparison between the search term and the preferred language metadata field for a given object should be weighted more heavily than a relevancy score generated by the search engine based on a comparison between the search term and another of the plurality of metadata fields for the given object that is not the preferred language metadata field.

Once the second search query has been generated, flowchart 1200 proceeds to step 1210. In step 1210, the second search query is provided to the search engine for execution thereby in accordance with the indication. As discussed with respect to step 1208, the second search query includes an indication that a relevancy score generated by the search engine based on a comparison between the search term and the preferred language metadata field for a given object should be weighted more heavily than a relevancy score generated by the search engine based on a comparison between the search term and another of the plurality of metadata fields.

Once the second search query has been provided to the search engine, flowchart 1200 proceeds to step 1212. In step 1212, a set of results from the search engine is received based on the execution of the second search query. As discussed above the search results are prioritized based on the weighting specified by the indication or scoring profile. Once the set of search results are received in step 1212, the method of FIG. 12 proceeds to step 1214 wherein the set of search results is provided to the search user interface.

Figure 13:
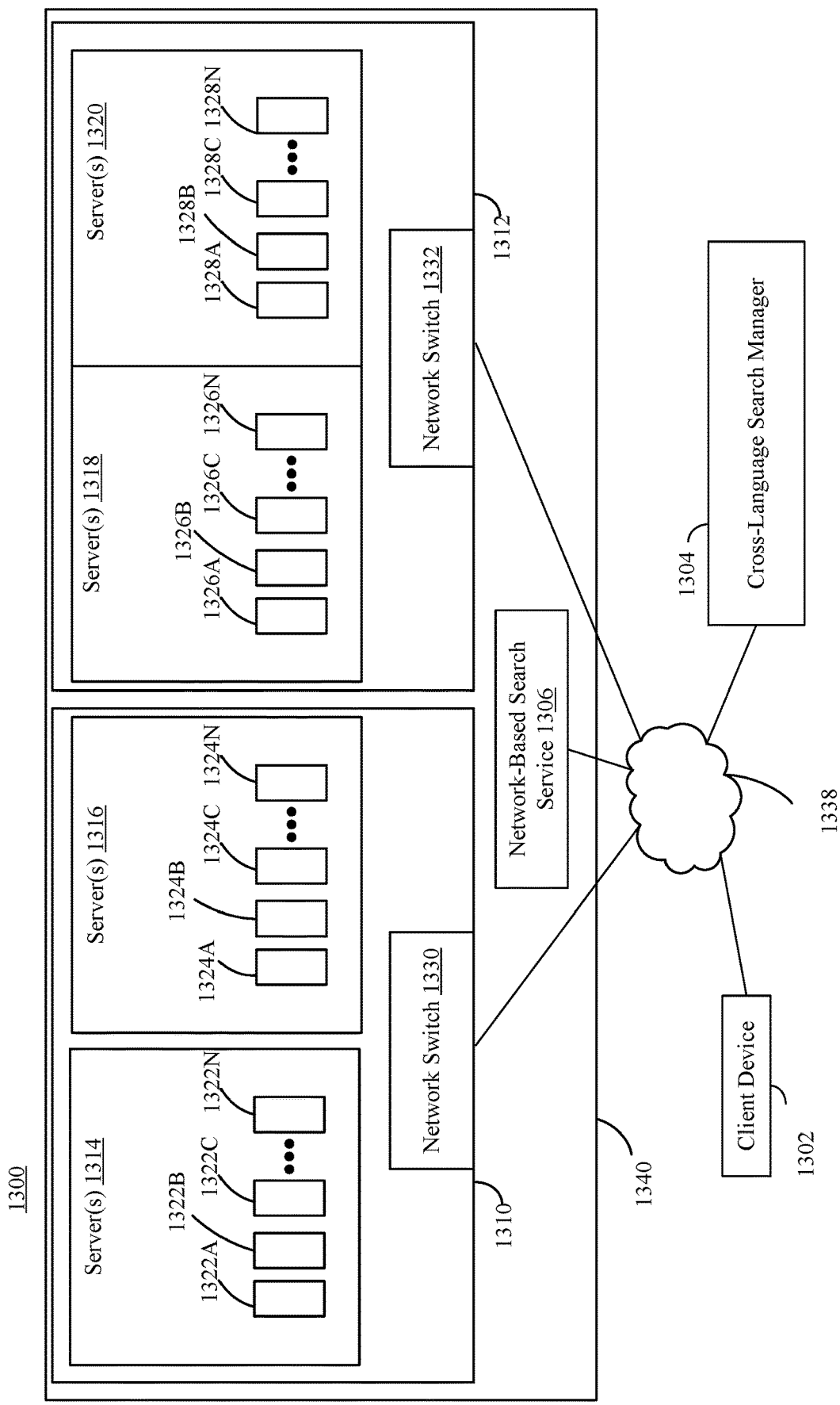
FIG. 13 shows a network-based cross-language search manager configured for managing searches in accordance with an example embodiment.

A system for performing a multi-language search in accordance with various embodiments described herein can be implemented in different manners. For example, FIG. 13 shows a network-based cross-language search manager configured for managing multi-language searches in accordance with an example embodiment. As shown in FIG. 13, system 1300 includes a plurality of resource sets 1310 and 1312, one or more client devices 1302, and one or more instances of a cross-language search manager 1304. Resource sets 1310 and 1312 (and any number of additional resource sets) define a network-accessible server infrastructure 1340. In the example of FIG. 13, resource set 1310 includes one or more servers 1314, one or more servers 1316, and a network switch 1330, and resource set 1312 includes one or more servers 1318, one or more servers 1320, and a network switch 1332. Resource sets 1310 and 1312, client(s) 1302, and cross-language search manager 1304 are communicatively coupled via network 1338. Though cross-language search manager 1304 is shown separate from resource sets 1310 and 1312, in an embodiment, cross-language search manager 1304 may be included in one or more servers in one or more of resource sets 1310 and 1312. Furthermore, any number of cross-language search managers 1304 may be present, such as one or more per resource set, one or more per server, etc. Network 1338 may comprise one or more networks such as local area networks (LANs), wide area networks (WANs), enterprise networks, the Internet, etc., and may include one or more of wired and/or wireless portions. In an embodiment, resource sets 1310 and 1312, client device(s) 1302, and cross-language search manager(s) 1304 may communicate via one or more application programming interfaces (API).

Resource sets 1310 and 1312 may form a network-accessible server set, such as a cloud computing server network defined by network-accessible server infrastructure 1340. For example, each of resource sets 1310 and 1312 may comprise a group or collection of servers (e.g., computing devices) that are each accessible by a network such as the Internet (e.g., in a "cloud-based" embodiment) to store, manage, and process data. As shown in the exemplary embodiment of FIG. 13, resource set 1310 includes server(s) 1314 and 1316, and resource set 1312 includes server(s) 1318 and 1320. Each of server(s) 1314, 1316, 1318 and 1320 may comprise any number of servers that are configured to host and execute one or more computing resources (e.g., computer networks, servers, storage, applications and services. For example, server(s) 1314 may include servers 1322A-1322N, server(s) 1316 may include servers 1324A-1324N, server(s) 1318 may include servers 1326A-1326N, and server(s) 1320 may include servers 1328A-1328N, where N is any integer greater than 1.

Resource sets 1310 and 1312 may include any type and number of other computing resources, including resources that facilitate communications with and between the servers (e.g., network switches, networks, etc.), storage by the servers (e.g., storage devices, etc.), resources that manage other resources (e.g., hypervisors that manage virtual machines to present a virtual operating platform for tenants of system 1300, etc.), and/or further types of resources. Servers of a resource set may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an embodiment, the servers of a resource set may be co-located (e.g., housed in one or more nearby buildings with associated components such as backup power supplies, redundant data communications, environmental controls, etc.) to form a datacenter, or may be arranged in other manners. Accordingly, in an embodiment, resource sets 1310 and 1312 may each be a datacenter in a distributed collection of datacenters.

In accordance with such an embodiment, each of resource sets 1310 and 1312 may be configured to service a particular geographical region. For example, resource set 1310 may be configured to service the northeastern region of the United States, and resource set 1312 may be configured to service the southwestern region of the United States. It is noted that the network-accessible server set may include any number of resource sets, and each resource set may service any number of geographical regions worldwide.

Note that the variable "N" is appended to various reference numerals identifying illustrated components to indicate that the number of such components is variable, for example, with any value of 2 and greater. Note that for each distinct component/reference numeral, the variable "N" has a corresponding value, which may be different for the value of "N" for other components/reference numerals. The value of "N" for any particular component/reference numeral may be less than 10, in the 10s, in the hundreds, in the thousands, or even greater, depending on the particular implementation.

Each of server(s) 1314, 1316, 1318, 1320 may be configured to execute one or more services (including microservices), applications, and/or supporting services. As shown in FIG. 13, server(s) 1314, 1316, 1318, 1320 may each be configured to execute supporting services. A "supporting service" is a cloud computing service/application configured to manage a set of servers (e.g., a cluster of servers in servers 1310) to operate as network-accessible (e.g., cloud-based) computing resources for users. Examples of supporting services include Microsoft® Azure®, Amazon Web Services™, Google Cloud Platform™, IBM® Smart Cloud, etc. A supporting service may be configured to build, deploy, and manage applications and services on the corresponding set of servers. Each instance of the supporting service may implement and/or manage a set of focused and distinct features or functions on the corresponding server set, including virtual machines, operating systems, application services, storage services, database services, messaging services, etc. Supporting services may be coded in any programming language. Each of server(s) 1314, 1316, 1318, 1320 may be configured to execute any number of supporting services, including multiple instances of the same and/or different supporting services.

Client device(s) 1302 include the computing devices of users (e.g., individual users, family users, enterprise users, governmental users, etc.) that may be tenants and/or that otherwise access network-accessible resource sets 1310 and 1312 for computing resources over network 1338. Client device(s) 1302 may include any number of computing devices, including tens, hundreds, thousands, millions, or even greater numbers of computing devices. Client device(s) 1302 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Client device(s) 1302 may each interface with server(s) 1314, 1316, 1318, 1320 through application programming interfaces (APIs) and/or by other mechanisms. Note that any number of program interfaces may be present.

As described above, cross-language search manager 1304 is configured to perform multi-language searches for client device(s) 1302. Cross-language search manager 1304 may incorporated in any type of stationary or mobile computing device(s) described elsewhere herein or otherwise known. For instance, cross-language search manager 1304 may be incorporated in a network/cloud supporting service mentioned elsewhere herein or otherwise known.

Example Computer System Implementation

Any of the components of systems 100, 200 and 400 of FIGS. 1, 2 and 4 and any of the steps of the flowcharts of FIGS. 3, 5-12 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 14:
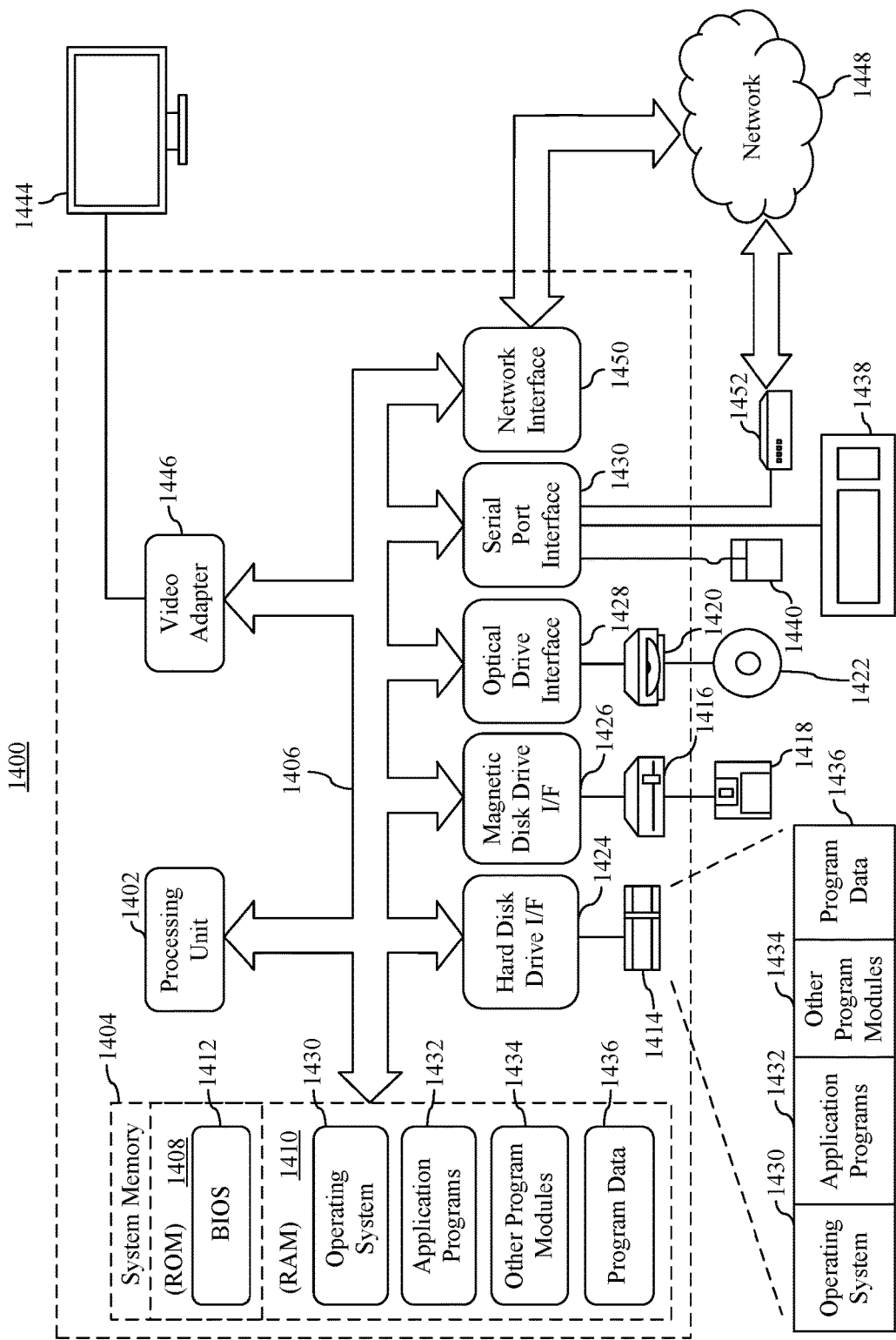
FIG. 14 depicts an example processor-based computer system that may be used to implement various embodiments described herein.

FIG. 14 depicts an example processor-based computer system 1400 that may be used to implement various embodiments described herein. For example, system 1400 may be used to implement any of the components of systems 100, 200 and 400 of FIGS. 1, 2 and 4 as described above. System 1400 may also be used to implement any or all the steps of the flowcharts depicted in FIGS. 3, 5-12. The description of system 1400 provided herein is provided for purposes of illustration, and is not intended to be limiting. Embodiments may be implemented in further types of computer systems, as would be known to persons skilled in the relevant art(s).

As shown in FIG. 14, system 1400 includes a processing unit 1402, a system memory 1404, and a bus 1406 that couples various system components including system memory 1404 to processing unit 1402. Processing unit 1402 may comprise one or more microprocessors or microprocessor cores. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

System 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, BLU-RAY™ disk or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules or components may be stored on the hard disk, magnetic disk, optical disk, ROM, or RAM. These program modules include an operating system 1430, one or more application programs 1432, other program modules 1434, and program data 1436. In accordance with various embodiments, the program modules may include computer program logic that is executable by processing unit 1402 to perform any or all the functions and features of systems 100, 200 and 400 of FIGS. 1, 2 and 4 as described above. The program modules may also include computer program logic that, when executed by processing unit 1402, performs any of the steps or operations shown or described in reference to the flowcharts of FIGS. 3, 5-12.

A user may enter commands and information into system 1400 through input devices such as a keyboard 1438 and a pointing device 1440. Other input devices (not shown) may include a microphone, joystick, game controller, scanner, or the like. In one embodiment, a touch screen is provided in conjunction with a display 1444 to allow a user to provide user input via the application of a touch (as by a finger or stylus for example) to one or more points on the touch screen. These and other input devices are often connected to processing unit 1402 through a serial port interface 1442 that is coupled to bus 1406, but may be connected by other interfaces, such as a parallel port, game port, or a universal serial bus (USB). Such interfaces may be wired or wireless interfaces.

A display 1444 is also connected to bus 1406 via an interface, such as a video adapter 1446. In addition to display 1444, system 1400 may include other peripheral output devices (not shown) such as speakers and printers.

System 1400 is connected to a network 1448 (e.g., a local area network or wide area network such as the Internet) through a network interface or adapter 1450, a modem 1452, or other suitable means for establishing communications over the network. Modem 1452, which may be internal or external, is connected to bus 1406 via serial port interface 1442. As used herein, the terms "computer program medium," "computer-readable medium," and "computer-readable storage medium" are used to generally refer to memory devices or storage structures such as the hard disk associated with hard disk drive 1414, removable magnetic disk 1418, removable optical disk 1422, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1432 and other program modules 1434) may be stored on the hard disk, magnetic disk, optical disk, ROM, or RAM. Such computer programs may also be received via network interface 1450, serial port interface 1442, or any other interface type. Such computer programs, when executed or loaded by an application, enable system 1400 to implement features of embodiments of the present methods and systems discussed herein. Accordingly, such computer programs represent controllers of the system 1400.

Embodiments are also directed to computer program products comprising software stored on any computer useable medium. Such software, when executed in one or more data processing devices, causes a data processing device(s) to operate as described herein. Embodiments of the present methods and systems employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

Additional Exemplary Embodiments

In an embodiment, a system comprises one or more memory devices that store executable program instructions and one or more processors operable to access the memory device(s) and to execute the executable program instructions. The executable program instructions comprise a query receiver configured to receive a search query from a search user interface, the search query comprising a search term in a first language. A search results evaluator is configured to determine whether execution of the search query will produce a sufficient number of search results. A cross-language search manager is configured to, in response to determining that the processing of the search query will not produce the sufficient number of search results: obtain a first translated version of the search term, the first translated version of the search term being in a second language that is different from the first language; request that a search be executed by a search engine based on at least the search term and the first translated version of the search term; receive a set of search results from the search engine based on the search; and return the set of search results to the search user interface.

In an embodiment, a search query transformer is configured to transform the search query from a non-localized form to a localized form by identifying different language versions of a metadata field to which the search term will be applied and assigning search relevancy weights to each of the different language versions of the metadata field. The search results evaluator is configured to determine whether execution of the localized form of the search query will produce the sufficient number of search results.

In an embodiment, the search query transformer is configured to transform the search query from the non-localized form to the localized form by identifying a preferred language associated with the search query and sending an identifier of a scoring profile to be used by the search engine, the scoring profile being selected from among a plurality of scoring profiles based on the preferred language associated with the search query, the selected scoring profile identifying the search relevancy weights to be applied to each of the different language versions of the metadata field.

In an embodiment, the search query transformer is configured to transform the search query from the non-localized form to the localized form by identifying a preferred language associated with the search query and assigning the search relevancy weights to each of the different language versions of the metadata field by including in the localized form of the search query a search relevancy weight for each combination of the search term and each of the different language versions of the metadata field.

In an embodiment, the search results evaluator is configured to determine whether the execution of the search query will produce the sufficient number of search results by accessing a cache that stores a previously-obtained number of search results obtained through execution of the search query.

In an embodiment, the search results evaluator is configured to determine whether the execution of the search query will produce the sufficient number of search results by requesting that the search engine execute the search query and determining a number of search results in a set of search results received from the search engine based on the execution of the search query.

In an embodiment, the cross-language search manager is configured to obtain the first translated version of the search term by one or more of accessing a cache that stores translated search terms previously obtained from a network-accessible remote translation service and sending a request to a network-accessible remote translation service.

In an embodiment, the cross-language search manager is configured to obtain the first translated version of the search term from a cache that stores translated search terms previously obtained from a network-accessible remote translation service; obtain a second translated version of the search term from a network-accessible remote translation service, the second translated version of the search term being in a third language that is different from the first language and the second language; and request that the search be executed by the search engine based on the search term, the translated version of the search term, and the second translated version of the search term.

In an embodiment, the cross-language search manager is further configured to terminate at least one of the obtaining, requesting, receiving or returning operations performed thereby in response to determining that a set of search results returned from a search executed by the search engine based on the search term and the first translated version of the search term has already produced the sufficient number of search results.

In an embodiment, a method includes receiving a search query from a search user interface, the search query comprising a search term in a first language. Whether execution of the search query will produce a sufficient number of search results is determined and, in response to determining that the processing of the search query will not produce the sufficient number of search results a first translated version of the search term is obtained, the first translated version of the search term being in a second language that is different from the first language. A search is requested to be executed by a search engine based on at least the search term and the first translated version of the search term. A set of search results is received from the search engine based on the search. The set of search results is returned to the search user interface.

In an embodiment, the search query is transformed from a non-localized form to a localized form by identifying different language versions of a metadata field to which the search term will be applied and assigning search relevancy weights to each of the different language versions of the metadata field. Determining whether execution of the search query will produce a sufficient number of search results comprises determining whether execution of the localized form of the search query will produce the sufficient number of search results.

In an embodiment, transforming the search query from the non-localized form to the localized form comprises identifying a preferred language associated with the search query and sending an identifier of a scoring profile to be used by the search engine, the scoring profile being selected from among a plurality of scoring profiles based on the preferred language associated with the search query, the selected scoring profile identifying the search relevancy weights to be applied to each of the different language versions of the metadata field.

In an embodiment, transforming the search query from the non-localized form to the localized form comprises identifying a preferred language associated with the search query and assigning the search relevancy weights to each of the different language versions of the metadata field by including in the localized form of the search query a search relevancy weight for each combination of the search term and each of the different language versions of the metadata field.

In an embodiment, determining whether the execution of the search query will produce the sufficient number of search results comprises accessing a cache that stores a previously-obtained number of search results obtained through execution of the search query.

In an embodiment, obtaining the first translated version of the search term comprises one or more of accessing a cache that stores translated search terms previously obtained from a network-accessible remote translation service and sending a request to a network-accessible remote translation service.

In an embodiment, obtaining the first translated version of the search term comprises obtaining the first translated version of the search term from a cache that stores translated search terms previously obtained from a network-accessible remote translation service. The method further comprises obtaining a second translated version of the search term from a network-accessible remote translation service, the second translated version of the search term being in a third language that is different from the first language and the second language. Requesting that the search be executed by the search engine comprises requesting that the search be executed by the search engine based on the search term, the translated version of the search term, and the second translated version of the search term.

In an embodiment, at least one of the obtaining, requesting, receiving or returning steps is terminated in response to determining that a set of search results returned from a search executed by the search engine based on the search term and the first translated version of the search term has already produced the sufficient number of search results.

In an embodiment, a method performed by at least one computing device, comprises receiving a first search query from a search user interface, the first search query comprising a search term to be compared to each of a plurality of metadata fields associated with each of a plurality of objects, each of the plurality of metadata fields including a different language version of the same metadata. A preferred language associated with the search query is determined. Based on the preferred language, identifying a preferred language metadata field is identified from among the plurality of metadata fields. A second search query is generated based on the first search query, wherein generating the second search query comprises including an indication in the second search query that a relevancy score generated by a search engine based on a comparison between the search term and the preferred language metadata field for a given object should be weighted more heavily than a relevancy score generated by the search engine based on a comparison between the search term and another of the plurality of metadata fields for the given object that is not the preferred language metadata field. The second search query is provided to the search engine for execution thereby in accordance with the indication. A set of search results is received from the search engine based on the execution of the second search query and the set of search results is provided to the search user interface.

In an embodiment, determining the preferred language associated with the search query comprises determining the preferred language associated with the search query based on information included in an accept-language header received with the first search query.

In an embodiment, determining the preferred language associated with the search query comprises determining the preferred language associated with the search query based on a parameter of an account associated with a user of the search user interface.

The example embodiments described herein are provided for illustrative purposes, and are not limiting. The examples described herein may be adapted to any type of system or method. Further structural and operational embodiments, including modifications/alterations, will become apparent to persons skilled in the relevant art(s) from the teachings herein.

CONCLUSION

While various embodiments of the present methods and systems have been described above, it should be understood that they have been presented by way of example only, and not limitation. It will be apparent to persons skilled in the relevant art that various changes in form and detail can be made therein without departing from the spirit and scope of the methods and systems. Thus, the breadth and scope of the present methods and systems should not be limited by any of the above-described exemplary embodiments, but should be defined only in accordance with the following claims and their equivalents.

What is claimed is:

1. A system, comprising:
   one or more memory devices that store executable program instructions; and
   one or more processors operable to access the memory device(s) and to execute the executable program instructions, the executable program instructions comprising:
   a query receiver configured to receive a search query from a search user interface, the search query comprising a search term in a first language;
   a search results evaluator configured to determine whether execution of the search query will produce a predetermined number of search results by comparing a previously-obtained number of search results obtained through a prior execution of the search query to a predetermined number of desired search results; and a cross-language search manager configured to, in response to determining that the execution of the search query will not produce the predetermined number of search results:

obtain a first translated version of the search term from a cache that stores translated search terms previously obtained from a network-accessible remote translation service as a part of a prior execution of the search query, the first translated version of the search term being in a second language that is different from the first language;

request that a search be executed by a search engine based on at least the search term and the first translated version of the search term;

receive a set of search results from the search engine based on the search; and return the set of search results to the search user interface.

2. The system of claim 1, further comprising:

a search query transformer that is configured to transform the search query from a non-localized form to a localized form by identifying different language versions of a metadata field to which the search term will be applied and assigning search relevancy weights to each of the different language versions of the metadata field;

wherein the search results evaluator is configured to determine whether execution of the localized form of the search query will produce the predetermined number of search results.

3. The system of claim 2, wherein the search query transformer is configured to transform the search query from the non-localized form to the localized form by:

identifying a preferred language associated with the search query; and sending an identifier of a scoring profile to be used by the search engine, the scoring profile being selected from among a plurality of scoring profiles based on the preferred language associated with the search query, the selected scoring profile identifying the search relevancy weights to be applied to each of the different language versions of the metadata field.

4. The system of claim 2, wherein the search query transformer is configured to transform the search query from the non-localized form to the localized form by:

identifying a preferred language associated with the search query; and assigning the search relevancy weights to each of the different language versions of the metadata field by including in the localized form of the search query a search relevancy weight for each combination of the search term and each of the different language versions of the metadata field.

5. The system of claim 1, wherein the search results evaluator is configured to determine whether the execution of the search query will produce the predetermined number of search results by:

requesting that the search engine execute the search query; and determining a number of search results in a set of search results received from the search engine based on the execution of the search query.

6. The system of claim 1, wherein the cross-language search manager is further configured to:

obtain a second translated version of the search term from the network-accessible remote translation service, the second translated version of the search term being in a third language that is different from the first language and the second language; and request that the search be executed by the search engine based on the search term, the first translated version of the search term, and the second translated version of the search term.

7. The system of claim 6, wherein the cross-language search manager is further configured to:

terminate at least one of the obtaining, requesting, receiving or returning operations performed thereby in response to determining that a set of search results returned from a search executed by the search engine based on the search term and the first translated version of the search term has already produced the predetermined number of search results.

8. A method, comprising:

receiving a search query from a search user interface, the search query comprising a search term in a first language;

determining whether execution of the search query will produce a predetermined number of search results by comparing a previously-obtained number of search results obtained through a prior execution of the search query to a predetermined number of search results; and in response to determining that the execution of the search query will not produce the predetermined number of search results:

obtaining a first translated version of the search term from a cache that stores translated search terms previously obtained from a network-accessible remote translation service as a part of a prior execution of the search query, the first translated version of the search term being in a second language that is different from the first language;

requesting that a search be executed by a search engine based on at least the search term and the first translated version of the search term;

receiving a set of search results from the search engine based on the search; and returning the set of search results to the search user interface.

9. The method of claim 8, further comprising:

transforming the search query from a non-localized form to a localized form by identifying different language versions of a metadata field to which the search term will be applied and assigning search relevancy weights to each of the different language versions of the metadata field;

wherein determining whether execution of the search query will produce the predetermined number of search results comprises determining whether execution of the localized form of the search query will produce the predetermined number of search results.

10. The method system of claim 9, wherein transforming the search query from the non-localized form to the localized form comprises:

identifying a preferred language associated with the search query; and sending an identifier of a scoring profile to be used by the search engine, the scoring profile being selected from among a plurality of scoring profiles based on the preferred language associated with the search query, the selected scoring profile identifying the search relevancy weights to be applied to each of the different language versions of the metadata field.

11. The method of claim 9, wherein transforming the search query from the non-localized form to the localized form comprises:
   identifying a preferred language associated with the search query; and
   assigning the search relevancy weights to each of the different language versions of the metadata field by including in the localized form of the search query a search relevancy weight for each combination of the search term and each of the different language versions of the metadata field.

12. The method of claim 8, wherein the method further comprises obtaining a second translated version of the search term from the network-accessible remote translation service, the second translated version of the search term being in a third language that is different from the first language and the second language; and
   wherein the requesting that the search be executed by the search engine comprises requesting that the search be executed by the search engine based on the search term, the first translated version of the search term, and the second translated version of the search term.

13. The method of claim 12, further comprising:
   terminating at least one of the obtaining, requesting, receiving or returning steps in response to determining that a set of search results returned from a search executed by the search engine based on the search term and the first translated version of the search term has already produced the predetermined number of search results.

14. A computer-readable storage medium having program instructions recorded thereon that, when executed by at least one processing circuit of a computing device, perform a method, the method comprising:
   receiving a search query from a search user interface, the search query comprising a search term in a first language;
   determining whether execution of the search query will produce a predetermined number of search results by comparing a previously-obtained number of search results obtained through a prior execution of the search query to a predetermined number of desired search results; and
   in response to determining that the execution of the search query will not produce the predetermined number of search results:
   obtaining a first translated version of the search term from a cache that stores translated search terms previously obtained from a network-accessible remote translation service as a part of a prior execution of the search query, the first translated version of the search term being in a second language that is different from the first language;
   requesting that a search be executed by a search engine based on at least the search term and the first translated version of the search term;
   receiving a set of search results from the search engine based on the search; and
   returning the set of search results to the search user interface.

15. The system of claim 1, wherein the previously-obtained number of search results comprises a single numerical value.

16. The system of claim 1, wherein the previously-obtained number of search results comprises a plurality of search results.

17. The method of claim 8, wherein the previously-obtained number of search results comprises a single numerical value.

18. The method of claim 8, wherein the previously-obtained number of search results comprises a plurality of search results.

19. The computer-readable storage medium of claim 14, wherein the previously-obtained number of search results comprises a single numerical value.

20. The computer-readable storage medium of claim 14, wherein the previously-obtained number of search results comprises a plurality of search results.

21. The computer-readable storage medium of claim 14, wherein the method further comprises:
   transforming the search query from a non-localized form to a localized form by identifying different language versions of a metadata field to which the search term will be applied and assigning search relevancy weights to each of the different language versions of the metadata field;
   wherein determining whether execution of the search query will produce the predetermined number of search results comprises determining whether execution of the localized form of the search query will produce the predetermined number of search results.

22. The computer-readable storage medium of claim 21, wherein transforming the search query from the non-localized form to the localized form comprises:
   identifying a preferred language associated with the search query; and
   sending an identifier of a scoring profile to be used by the search engine, the scoring profile being selected from among a plurality of scoring profiles based on the preferred language associated with the search query, the selected scoring profile identifying the search relevancy weights to be applied to each of the different language versions of the metadata field.

23. The computer-readable storage medium of claim 21, wherein transforming the search query from the non-localized form to the localized form comprises:
   identifying a preferred language associated with the search query; and
   assigning the search relevancy weights to each of the different language versions of the metadata field by including in the localized form of the search query a search relevancy weight for each combination of the search term and each of the different language versions of the metadata field.

24. The computer-readable storage medium of claim 14, wherein the method further comprises obtaining a second translated version of the search term from the network-accessible remote translation service, the second translated version of the search term being in a third language that is different from the first language and the second language; and
   wherein the requesting that the search be executed by the search engine comprises requesting that the search be executed by the search engine based on the search term, the first translated version of the search term, and the second translated version of the search term.

* * * * *